(12) United States Patent
Anderson

(10) Patent No.: US 12,173,455 B2
(45) Date of Patent: Dec. 24, 2024

(54) ARTIFICIAL LAWN EDGING

(71) Applicant: Vertedge Ltd, London (GB)

(72) Inventor: Dean Anderson, Loughton (GB)

(73) Assignee: VERTEDGE LTD (GB)

( * ) Notice: Subject to any disclaimer, the term of this patent is extended or adjusted under 35 U.S.C. 154(b) by 452 days.

(21) Appl. No.: 17/436,529

(22) PCT Filed: Mar. 6, 2020

(86) PCT No.: PCT/GB2020/050548
§ 371 (c)(1),
(2) Date: Sep. 3, 2021

(87) PCT Pub. No.: WO2020/183137
PCT Pub. Date: Sep. 17, 2020

(65) Prior Publication Data
US 2022/0174891 A1 Jun. 9, 2022

(30) Foreign Application Priority Data

Mar. 8, 2019 (GB) .................................... 1903148
Dec. 20, 2019 (GB) .................................... 1919108

(51) Int. Cl.
*E01C 11/22* (2006.01)
*A01G 9/28* (2018.01)
*E01C 13/08* (2006.01)

(52) U.S. Cl.
CPC .............. *E01C 11/221* (2013.01); *A01G 9/28* (2018.02); *E01C 13/08* (2013.01)

(58) Field of Classification Search
CPC ....... A01G 9/28; A47G 27/045; E01C 11/221; E01C 13/08
See application file for complete search history.

(56) References Cited

U.S. PATENT DOCUMENTS 3,003,185 A * 10/1961 Grunwald ............ A47G 27/045
D25/60
3,733,647 A 5/1973 Jakel
(Continued)

FOREIGN PATENT DOCUMENTS

CA 2542441 A1 12/2006
DE 3143476 A1 5/1983
(Continued)

OTHER PUBLICATIONS

International Search Report & Written Opinion, issued in International Application No. PCT/GB2020/050548, mailed Jul. 21, 2020 (14 pages).

*Primary Examiner* — Jessie T Fonseca
(74) *Attorney, Agent, or Firm* — Morris, Manning & Martin, LLP; Daniel E. Sineway, Esq.; Adam J. Thompson, Esq.

(57) ABSTRACT

Lawn edging comprises a segmented elongate member (11) in which segments (11A) are joined in one of its two states by plastic hinges (21) and by thinned regions or cut-outs (23), (24) of base (12) and of arcuate wall member (13). The edging is rigid in that form and can be used to edge a straight boundary between an artificial grass area and another landscape feature. Removal of cut-outs (23, 24) from the connection region between two segments disapplies the flexibility restraint they impose. The segments concerned can then be displaced one relative to the other by articulation at the hinge (21) to accommodate non-linearity such as commonly found in such boundaries. One or more than one connection region can be treated in this way depending on need.

20 Claims, 14 Drawing Sheets

(56) References Cited

U.S. PATENT DOCUMENTS

| | | | | |
|---|---|---|---|---|
| 3,916,563 | A | * | 11/1975 | Tedesh ............... A01G 9/28 47/33 |
| 4,067,757 | A | | 1/1978 | Layman |
| 4,312,504 | A | | 1/1982 | Rutledge et al. |
| 4,381,622 | A | | 5/1983 | Spidell |
| 4,969,289 | A | | 11/1990 | Trifiletti |
| 5,092,076 | A | * | 3/1992 | Terreta ............... A01G 9/28 47/33 |
| 5,240,343 | A | * | 8/1993 | Strobl, Jr. ............ E01C 11/221 404/8 |
| 5,421,118 | A | * | 6/1995 | Bauer ............... A01G 9/28 47/33 |
| 5,993,107 | A | * | 11/1999 | Bauer ............... A01G 9/28 404/34 |
| 6,085,458 | A | * | 7/2000 | Gau ............... A01G 9/28 47/33 |
| 6,327,815 | B1 | * | 12/2001 | Becton ............... A01G 9/28 47/33 |
| 6,502,349 | B1 | * | 1/2003 | Richet ............... A01G 9/28 47/33 |
| 6,625,925 | B1 | * | 9/2003 | Foster ............... A01G 9/28 47/33 |
| 9,068,355 | B1 | * | 6/2015 | Ksiezopolski .... E04F 15/02016 |
| 10,182,532 | B1 | * | 1/2019 | Asher ............... A01G 9/28 |
| 2006/0236601 | A1 | | 10/2006 | Barber |
| 2009/0038238 | A1 | | 2/2009 | Kurtz et al. |
| 2009/0183426 | A1 | * | 7/2009 | Leiter ............... A01G 9/28 47/33 |
| 2009/0223121 | A1 | * | 9/2009 | Jones ............... A01G 9/28 47/33 |
| 2010/0186293 | A1 | * | 7/2010 | Flynn ............... A01G 9/28 47/33 |
| 2012/0174479 | A1 | * | 7/2012 | Leiter ............... A01G 9/28 47/33 |
| 2012/0276342 | A1 | | 11/2012 | Bray |
| 2014/0041293 | A1 | * | 2/2014 | Kellogg ............... A01G 9/28 47/33 |
| 2015/0098758 | A1 | | 4/2015 | Krauss et al. |
| 2015/0139742 | A1 | | 5/2015 | Fellars |
| 2017/0044725 | A1 | | 2/2017 | Thomas et al. |
| 2018/0371706 | A1 | | 12/2018 | Ziegan |

FOREIGN PATENT DOCUMENTS

| | | |
|---|---|---|
| DE | 29819116 U1 | 1/2000 |
| DE | 202004003826 U1 | 6/2004 |
| DE | 202006008444 U1 | 10/2006 |
| DE | 202015004437 U1 | 8/2015 |
| EP | 0798418 A1 | 10/1997 |
| GB | 2545247 A | 6/2017 |
| KR | 2010035505 A | 4/2010 |
| WO | 2006025973 A2 | 3/2006 |
| WO | 2009075587 A1 | 6/2009 |
| WO | 201312464 A1 | 1/2013 |
| WO | 2020183137 A1 | 9/2020 |

* cited by examiner

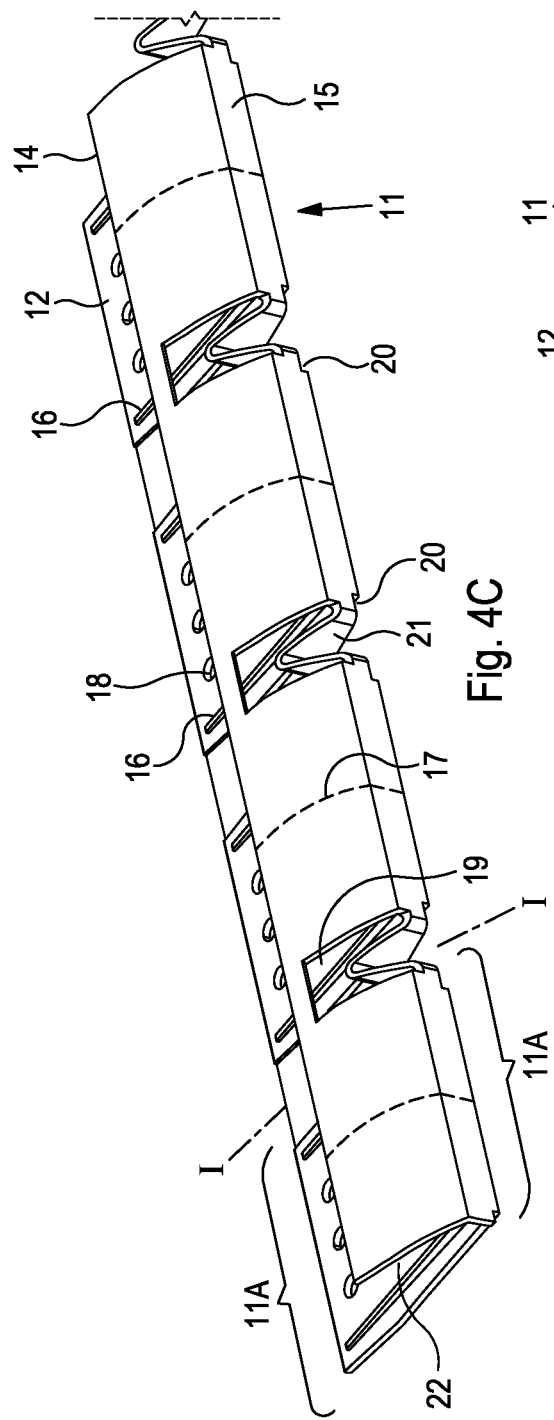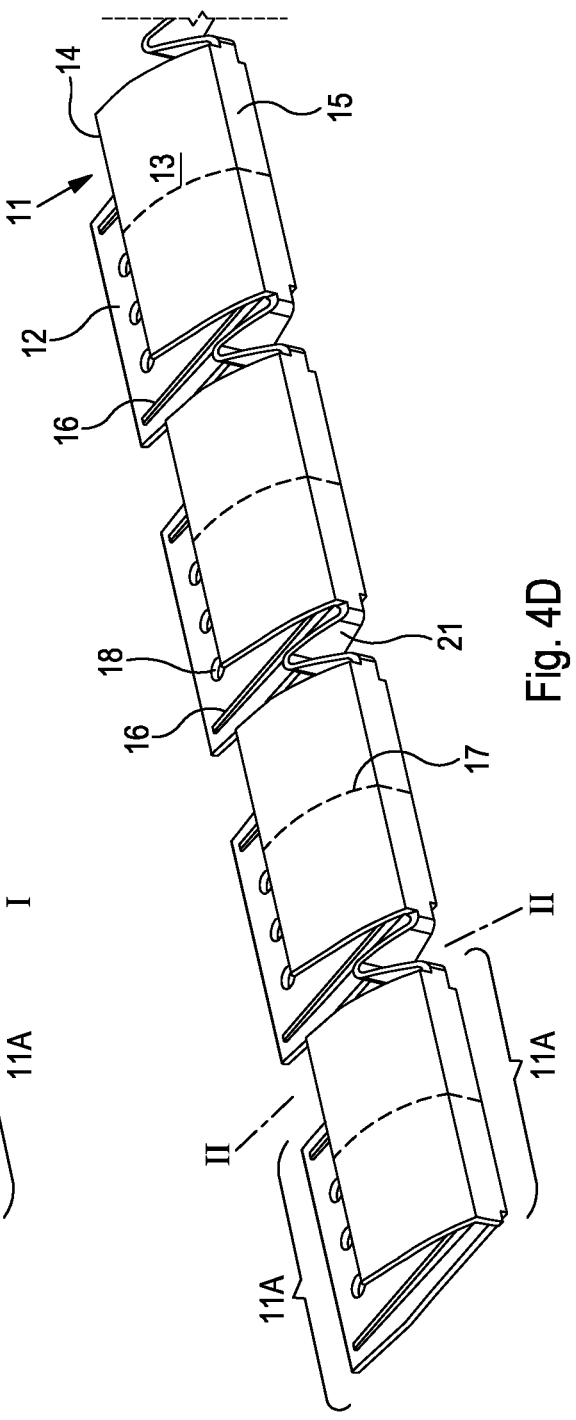

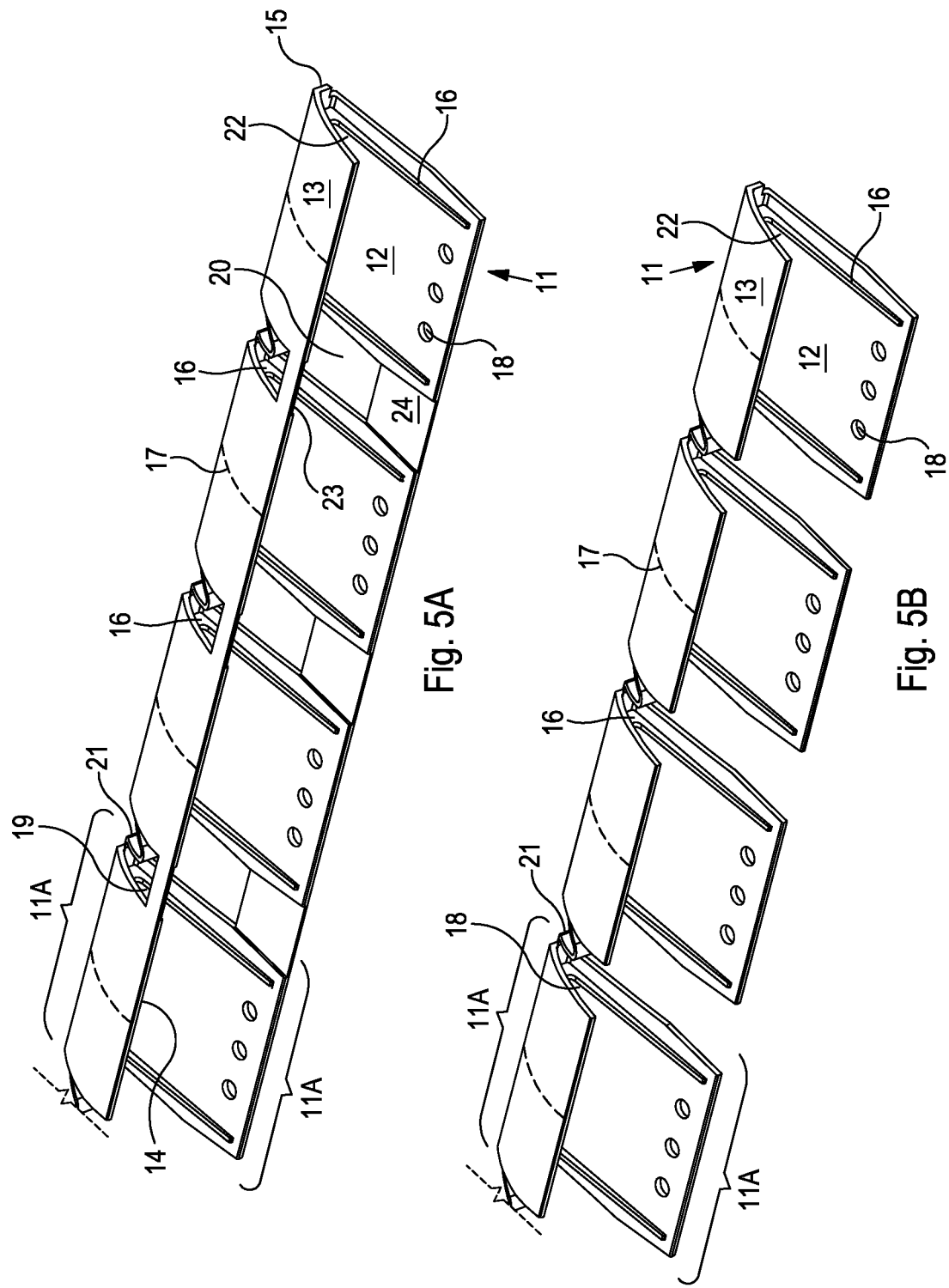

ARTIFICIAL LAWN EDGING

CROSS REFERENCE TO RELATED APPLICATIONS

This application is a national phase application of, and claims benefit of and priority to International Application No. PCT/GB2020/050548, filed Mar. 6, 2020, entitled "ARTIFICIAL LAWN EDGING," which claims priority to Great Britain Application No. 1903148.3, filed Mar. 8, 2019, entitled "LAWN APPARATUS," and Great Britain Application No. 1919108.9, filed Dec. 20, 2019, entitled "IMPROVED LAWN EDGING AND USE THEREOF," the disclosures of which are incorporated herein by reference as if set forth herein in their entireties.

FIELD OF THE INVENTION

The invention relates to an edging for an artificial lawn, the edging having a form in which there are constraints on flexibility and a form in which some or all of the constraints have been removed so that the edging is flexible and can negotiate irregularities in artificial lawn boundaries such as curves, bends and turns. The first-mentioned form is typically a pre-deployment form but can be used as such in contexts where there is no requirement for flexibility or where the constraints on flexibility are partial, as described later herein.

BACKGROUND

Artificial grass has grown in popularity in domestic environments. However, it is difficult to provide a fixed edge providing a neat finish for lawn coverings, such as artificial grass lawns where the boundary with another landscape feature is not linear. At the same time, a lawn edging must in practice provide a fixed boundary line which is neat and also durable.

Known devices are generally serviceable to an extent when applied to a linear boundary. However, in the significantly large number of cases where the boundary is non-linear, ad hoc solutions must be devised and applied on site during installation. These solutions generally involve cutting and shaping processes which result in a product which is unsatisfactory in one way or another.

GB2545247A recognises that lawns will sometimes have a non-linear border although in this case only in the limited context of a corner section of a rectangular lawn. The document discloses an edge piece 100 of artificial turf 102 disposed on a resiliently flexible backing member 104 which may be arc-shaped. The backing member may be made of elastomeric foam, polyethylene foam or foam rubber and may comprise a section of insulating material. The edge piece may further comprise an attachment means such as a plurality of screws 108 for attaching the edge piece to a surface. The document does not address the problem of providing an edging in situations where the lawn edge comprises a non-linear section.

US2019169803 and US2018030671 (US20150139742A) discloses an edging system for open borders of artificial grass or natural grass (ie as distinct from borders with eg a wall or paved area). The product is made of galvanised steel and has spikes along each section for fixing the edging into the ground. Once fixed into the ground, an upright steel edge is formed as an abutment for an artificial grass or natural grass lawn area. The grass stratum butts up to the product leaving it exposed.

US20170044725A discloses a border member for establishing a border around a synthetic turf field which comprises (see eg FIGS. 1A and 4) an elongate body moulded from a flexible material, at least one notch formed in an upper surface of the elongate body and extending along a length of the elongate body and a rigid spine embedded within the elongated body and extending along the length of the elongated body. The border member is positioned adjacent to the synthetic turf field such that a portion of synthetic turf rests on the notch. The trim is used to create a visible border around an artificial grass field.

Inventive Concept of the Invention

Providing flexibility, in at least a part of the length of a lawn edging comprising an elongate member, by segmentation of the elongate member and connection of the segments each to its next adjacent segment by means of an articulation, rather than by reliance on use of flexible materials to provide such flexibility. The segmentation just referred to is also combined with flexibility restraint by use of rigidity-conferring segment-to-segment connection(s), to provide for handling and carriage, flexibility restraint being disapplied when the edging is put to use and that restraint no longer needed.

SUMMARY OF THE INVENTION

The invention has several aspects, each having plural embodiments.

In summary, the invention provides an edging for artificial grass lawn in which one or more segments of a segmented elongate member of the edging are connected to a next adjacent segment by an articulation enabling the edging to follow a non-linear boundary between the artificial lawn and another landscape feature. For convenience of handling, the edging is made in a form in which the flexibility is restrained at individual connection level by severable further connection between the segments so that the edging can more easily be handled and transported. With interests of that state in mind, the material of which the edging is made would ordinarily be a rigid material as opposed to a flexible material such as a rubber. The flexibility restraint is disapplied for one segment connection, and usually two or more segment connections, so that the edging can be deployed and made to conform to, or at least to follow, any one or more non-linearities in the boundary.

In a first aspect, the invention provides an artificial lawn edging for installation as part of an artificial lawn installation comprising an artificial grass layer extending to form an artificial lawn between perimeter edges which terminate the artificial grass layer at a boundary thereof with another landscape surface, eg hard landscape such as a path or paved other area, the edging comprising a segmented elongate member in which each segment of a plurality of individual segments (preferably, a plurality of three or more segments, eg eight segments) is connected to its next adjacent said segment(s), each segment having a first face for receiving a perimeter edge portion of said artificial grass layer for fixture thereto when the edging is in a boundary-located state wherein a second face of said segment is supported on a ground-support surface for the elongate member, for example a sub-surface underlying a support surface upon which the artificial grass layer is disposed, the segments of at least a pair of next adjacent segments of said plurality of segments being connected together at a segment connection by connection means, preferably connection means respective or specific to that segment connection, provided at a connection region of said elongate member, said connection means comprising either:

(i) first connection means which comprises an articulation connecting together said segments of said segment pair to enable relative displacement between the so-articulated segments at said articulation to deform said elongate member at said connection region so that said elongate member in said boundary-located state of the edging can follow a non-linearity (eg a curve or an angled turn) in said boundary local to said connection region, or (ii) first and second connection means in which:
   (a) that first connection means comprises an articulation connecting together said segments of said segment pair to enable said relative displacement between the so-articulated segments, except if and to the extent that the flexibility restraint referred to in (ii)(b) below is applied across the connection region at which said segments are connected, at said articulation to effect said deformation, and
   (b) the second connection means applies, by severable further connection between the so-articulated segments connected by said connection means (eg the second connection means may be a severable connector which provides severable connection from one segment to another), for as long as said further connection is not severed to disapply it, flexibility restraint across the connection region at which said segments are connected to restrain or prevent said relative displacement and said deformation.

By the expression "which provides severable further connection from one segment to another", the intention of the Applicant is to refer to a condition or state of connection being provided (in this case, one which is severable), in the sense of an abstract noun, rather than to a connection in the physical sense of a concrete noun.

In the invention according to the first aspect described above, the embodiment referred to in sub-paragraph (i) describes what in practice will be a form of the edging in which it is about to be deployed or has already been deployed, that form (the "deployment form" of the edging) normally having been produced starting from a form as described in sub-paragraph (ii) above (the "as manufactured form" of the edging) and disapplying the flexibility restraint. Nevertheless, the embodiment referred to in sub-paragraph (i) is included within the scope of the invention regardless of how it has been produced.

Still referring to the first aspect of the invention as describe above, three or more segments of said segment plurality (eg eight segments) may, for example, be connected, in one more separate segment successions, each segment to a next adjacent segment in the succession containing them, by a said connection means. In general, the number of so-connected segments will amount to most or all of the segments of said segment plurality.

Of primary, although not exclusive, interest in terms of the invention, however, there is provided an artificial lawn edging for installation as part of an artificial lawn installation comprising an artificial grass layer extending to form an artificial lawn between perimeter edges which terminate the artificial grass layer at a boundary thereof with another landscape surface, the edging comprising a segmented elongate member in which each segment of a plurality of individual segments is connected to its next adjacent said segment(s), each segment having a first face for receiving a perimeter edge portion of said artificial grass layer for fixture thereto when the edging is in a boundary-located state wherein a second face of said segment is supported on a ground-support surface for the elongate member, the segments of at least a pair of next adjacent segments of said plurality of segments being connected together at a segment connection by connection means respective to that segment connection and provided at a connection region of said elongate member, said connection means comprising first connection means which comprises an articulation connecting together said segments of said segment pair and second connection means which applies, by severable further connection between those segments, flexibility restraint across the connection region at which said segments are connected, said first connection means enabling, except if and to the extent that said flexibility restraint is applied across said connection region, relative displacement between the so-articulated segments at said articulation to deform said elongate member at said connection region so that said elongate member in said boundary-located state of the edging can follow a non-linearity in said boundary local to said connection region, specifically one which it could not, when said flexibility restraint is applied, follow.

A remarkable feature of the invention is the flexibility differential between the edging in the condition in which the segment pair is provided with both an articulation and means for restraining flexibility and the condition in which it is provided with only the articulation. In the former case (when both first and second connection means are provided), the flexibility will be modest (at best) in practice and it is generally the case that the construction will provide rigidity or substantial rigidity (this may be expressed, for example, as an inability to follow a line requiring one segment to be displaced in relation to the other of the segment pair through an angle of more than 5 degrees, commonly an inability to follow a line requiring one segment to be rotationally displaced in relation to the other of the segment pair through a smaller angle such as 2 degrees or less). In the condition in which the segment pair is provided with an articulation but no means for restraining flexibility, the edging can follow a line requiring one segment to be rotationally displaced in relation to the other of the segment pair through an angle of 90 degrees. Further reference to this feature appears hereinafter. It will, of course, be understood that when the number of articulated segments in succession is greater than a single pair of segments, there is cumulative rotational displacement capacity.

In practice, the edging will be usually provided for use by the user as a length of the elongate member in which all the two or more segments (for example, eight segments) are connected at a connection region as described above by first and second connection means (giving, for example, four articulated segment pairs). However, as few as two segments, eg in an elongate member comprising a larger number of segments overall, may be so-connected. In such configurations as just mentioned, as indeed is the case in all configurations, the capacity for the elongate member to deform so as to follow a boundary non-linearity will, of course, be limited to its capacity to deform at the locality or localities of the so-articulated segments. In the case of a single pair of articulated segments, this presents the user with narrow choices in terms of the severable further connections available to sever. An edging comprised of more than a single articulated pair could be configured to follow a boundary non-linearity at each of eg two locations spaced apart more widely than the distance between one connection region and the next (which latter is broadly, in practice, the distance between one pair of so-articulated segments and the next pair, measured between their respective centre points). However, such a specific configuration would be an unusual and narrowly useful form of the edging of the invention, such a practical situation ordinarily being addressed in the field by an edging in which each of the segments making up an elongate member of eg eight segments is connected to a next adjacent segment by first and second connection means, those segment connections where it is necessary for the edging to deform to follow a boundary non-linearity being subject to severance of the severable further connection provided by the second connection means.

Conveniently, the "at least a pair of next adjacent segments" comprises at least one succession of three or more said segments each of which segments is connected by a said connection means to its next adjacent segment in its succession and which collectively make up the or one length of said elongate member, and optionally one or more further segments which make up a balance of that length, form part of said plurality of segments and are not articulated. For example, one succession of at least three next adjacent segments may be present and comprise at least eight said segments and there may be no other (ie non-articulated) segments. It follows that, in practice, edging in which the elongate member has been deployed could have had only a small number of severable further connections severed but the number could be quite large in real field situations when eg a lengthy curving boundary is involved. The invention includes within its scope an edging in which, as manufactured or resulting from a process which involves post-manufacture severance of said severable further connection (s), the elongate member comprises at least two segments connected by a said first connection means and at least one segment connected to a segment so-connected by both a said first connection means and a said second connection means.

The Second Connection Means

In a particular embodiment of the invention, said second connection means comprises one or more sub-members of said elongate member which are removable of otherwise disconnectable from it to disapply said flexibility restraint. For example, the second connection means is conveniently in the form of one or more severable stiffening members which are severable from the elongate member using eg a hand-held snipping tool. The second connection means may conveniently take the form of a single severable stiffening member or two such members.

The or each stiffening member may conveniently extend between elements of next adjacent segments connected together by said connection means, each of which elements provides at least part of said first face and/or the or each stiffening member extends between elements of next adjacent so-connected segments each of which elements provides at least part of said second face.

In particular, the second connection means may comprise a first stiffening member which extends between an elongate member element of a first segment and an elongate member element of a next adjacent second segment connected to said first segment by said connection means, and a second stiffening member which extends between another elongate member element of said first segment and another elongate member element of said next adjacent second segment.

The first-mentioned elongate member elements may advantageously form at least part of said first face and the second-mentioned elongate member elements may form at least part of said second face.

In a preferred embodiment of the invention, the second connection means comprises one or more separable regions of elongate member material which confers or, in the case of plural such separable regions, which together or individually are (is) responsible for, applying said flexibility restraint. The separable regions are advantageously visibly (or, in any event, advantageously physically) designated to enable identification.

Most preferably, the separable regions comprise regions of designated removable elongate member material whose designation is indicated by said so-designated regions having lesser thickness than surrounding regions of the elongate member, which will commonly have uniform thickness. For example, as described in greater detail hereinafter, the first and second faces of the elongate member may be faces of construction elements of the elongate member which have a thickness of 1.5 mm to 2.5 mm, most commonly 2 mm, in which case the separable regions referred to above may have a lesser thickness eg of 0.8 mm to 1.4 mm, most commonly 1 mm.

In terms of the edging in "as manufactured form" in which each segment comprises a segment base and an opposed wall member, as described hereinbelow, the segment base and/or the wall member may extend as a region of designated removable elongate member material into the connection region. Preferably, one such region will be provided in each of the segment base and an opposed wall member.

Amongst embodiments in which flexibility restraint is applied across one or more connection regions at which elongate member segments connect together at a connection region, preferred are those in which the elongate member is in the form of a hollow body defined by one or more body walls, segments (eg those of an articulated segment pair—or larger succession of such segments) of the elongate member being separated from one another by a said connection region and the body walls including one or more bridge portions which bridge across the connection region to link the segments of said pair in order to provide the flexibility restraint and which are differentiated from adjacent body wall portions eg by doing so per se (ie bridging per se) and/or by other means. Self-evidently, in cases where there is a segment succession larger than a pair, not all connection regions need to be bridged in this way but it is most convenient if this is the case.

It will be understood from the above that the second connection means may comprise plural components which together contribute the flexibility restraint referred to. It will therefore be recognised that the required severance of the severable further connection to disapply the flexibility restraint and enable relative displacement between segments will usually in practice call for all second connection means components to be severed.

The First Connection Means

Turning now to the first connection means, this important component may conveniently comprise, as an articulation, a resilient connector which is fixed to both segments connected by said first connection means.

The resilient connector may conveniently comprise a sprung member. In a preferred embodiment of the invention, the first connection means comprises any resilient member eg one configured to a V-shape to provide a pair of arms which are resiliently hinged, in particular at the crutch of the V, to permit relative displacement between the segments connected by said first connection means to deform said elongate member at said connection region so that said elongate member can follow a non-linearity in said boundary local to said connection region.

The first connection means most preferably comprises a plastics hinge, for example, one having the particular form and operation just referred to (ie a V-configuration). However, other forms of articulation are serviceable, for example one in the form of a pleated member connecting adjacent segments. Such a member can be likened to a bellows or accordion structure.

The Connection Region

Each connection region is normally an inter-segmental region of the elongate member but, in certain embodiments, the segments of each segment pair may be juxtaposed at the connection region and not spaced apart.

In the "as manufactured" state of the edging, the connection region of the elongate member at which the segments of an articulated segment pair are connected (or, where there are more such segments than a single pair, all or only some of them, eg one connection region) preferably comprises the articulation, the second connection means, a first window separating the respective first faces of the articulated segments each in part from one another (eg apart from said faces being connected by an element of the second connection means) and a second window separating the respective second faces of the articulated segments each in part from one another (eg apart from said faces being connected by an element of the second connection means). The foregoing structure may be adopted by the elongate member at any one or more of said connection regions, conveniently most of them and preferably all of them.

In a favoured embodiment of the invention, as just described in the immediately preceding paragraph, the windows meet at the articulation in order to present as a single window interrupted by the articulation.

Conveniently, as is preferred in all embodiments of the invention, the articulation is disposed at a junction between the first and second faces (where, for example, means defining a third face may be provided such as a third face which can be butted to a lawn boundary object forming part of the other landscape surface referred to earlier), in which case the window in the favoured embodiment described above conveniently extends either side of said interruption between an extremity defined by a component of said second connection means connecting together the segment first faces in the segment pair and an extremity defined by a component of said second connection means connecting together the segment second faces in the segment pair, whereby the elongate member is inflexible or rigid across said connection region as a result of the severable further connection created across the connection region.

In such a structure as just defined above, the second connection means components may be omitted whereby the connection region is a void between the segments bridged by said articulation so that the elongate member is already flexible across said connection region in readiness for use; or alternatively, if included (as preferred according to the invention for "as manufactured" embodiments), the second connection means components may be included and then later removed to the same effect. The elongate member can in either manner conform to or follow a non-linearity in a boundary which the edging is to define between a lawn area and another landscape surface.

Of course, instead of removal or omission of a second connection means component, the further severable connection between the segments of an articulated segment pair may be severed by implementing a measure other than removal (eg by cutting). Thus, in any articulated segment pair, one or each of the second connection means components may be (i) omitted or (ii) included but then (a) removed or (b) the further severable connection severed by other means such as cutting in such a manner as to sever the connection so as to allow relative displacement between the segments; and the or each of any further articulated segment pairs may be treated either the same or differently in respect of these options and option combinations as any other.

Segment Count and Connection

As a generality, the edging of the invention is preferably produced as an elongate member having plural segments, such as eight segments, each of which is connected to its next adjacent segment by first connection means so that the optimum number of choices is offered to the user in terms of flexibility of use in real life field situations. Similarly, the elongate member is preferably equipped with second connection means at each segment connection where a first connection means is provided or at least most of them. Thus, in one embodiment, the plurality of segments of said elongate member conveniently comprises a succession of from six to twelve segments some or each of which is connected to its next adjacent segment in the succession by a said connection means; the succession conveniently comprises eight segments connected each to its next adjacent segment by a said first and a said second connection means.

It will be appreciated that supply to a user of an edging in which, as an extreme example, all locations where a first connection means is provided are devoid of a second connection means would pose challenges in terms of carriage (ie transportation), general handling (especially at point of use) and storage as each such edging would lack the stability of shape and form desirable for such exercises. However, flexibility in the edging prior to use could be tolerated although normally ameliorated by compensatory means, for example use of a tie.

Of particular interest in the unusual event that the segment count in an elongate member were to mean a considerable length to the edging, the elongate member might be produced in two arms connected by a first connection means. Thus, in an embodiment of the invention, a lawn edging is provided in which a segment connection is provided with a first connection means but with no second connection means, said segment connection dividing the elongate member into two arms, of equal or unequal length, each comprising plural segments arranged in respective successions with at least some and preferably all segment connections being provided with a said first connection means, some or all said so-provided segment connections being provided with a said second connection means. The arms could, of course, be secured together by use of a tie.

In general, said second connection means is provided respective to each of plural segment connections where next adjacent segments are articulated together with a said articulation.

Generally, an elongate member is devoid of said connection means at its terminal ends.

General Construction of the Elongate Member

In an embodiment of the invention, the elongate member is configured for inclusion in a lawn installation in which an artificial grass layer is supported upon a surface of a lawn base layer disposed over a lawn sub-base, said first faces of said segments in aggregate forming a platform of said elongate member for receiving thereupon a perimeter edge portion of said artificial grass layer for fixture to said platform in termination of said artificial grass layer, said elongate member terminating said lawn base layer at a perimeter edge portion thereof which underlies said artificial grass layer perimeter edge portion and said second faces of said segments in aggregate forming a further platform or plate which in use of the edging is disposed upon and engaged with said lawn sub-base.

The connection means preferably connects next adjacent segments which each comprise a segment base and an opposed wall member and the wall member may provide said first face and said segment base may provide said second face.

The segment base and opposed wall member, or in any event, the elongate member sub-members or parts providing the first and second faces, are conveniently connected to form a cavity therebetween for receiving, in the lawn installation, a perimeter portion of a lawn base layer in an overlying relationship thereof with said segment base and in an underlying supporting relationship with said wall member, the segment base and wall conveniently defining for this purpose an opening for admission to the cavity of said lawn base layer perimeter portion.

Conveniently, each segment cavity is open to that of the next adjacent segment eg across an inter-segmental region of the elongate member at which segments in said segment plurality may face each other across the width of the elongate member, for example across an inter-segmental region at which segments of a segment pair face each other.

The elongate member may be configured for inclusion in a lawn installation (a) in which an artificial grass layer is fixed to said first face of each segment and terminates at a junction at which said first and second faces meet and (b) in which said junction abuts the other landscape surface, eg by a junction abutment of the elongate member.

It is preferred according to the invention that the articulation is so positioned that the segments it connects can undergo displacement relative to one another without the segments coming into competition with one another for the same spatial position. Such competition could mean a limitation on the magnitude of the relative displacement and thus the ability of the elongate member to negotiate a non-linearity in the boundary between the artificial lawn area and the other landscape surface. Accordingly, in preferred embodiments, the elongate member conveniently comprises a first side and a second side both extending in opposed relation from a first segment to a last segment in a succession of at least two segments connected each to its next adjacent segment, at least two of the segments being connected by a first connection means which provides a fulcrum at one of said two sides enabling the elongate member to be deformed, when said edging is in its boundary-located state and said flexibility restraint is not applied, at the connection region at which said so-connected segments are connected, by a sweep of one of said two segments across said ground support surface in which sweep that segment is displaced through an angle of eg at least 45 degrees. The sweep referred to will, of course, be of different direction depending upon the direction the boundary takes at the boundary non-linearity; for example, a boundary convex curve and a boundary concave curve will call for sweeps in different directions, as would turns defined by internal angles on the one hand and external angles on the other hand. The preferred embodiments of the invention call for deformability of the elongate member to follow boundary non-linearities regardless of the direction taken by the boundary at that non-linearity, although the elongate member will behave differently according the direction taken by the boundary.

In elongate members where the segment first and second faces are provided by a wall member and a base, the bases are conveniently and preferably designed so that they can overly a common ground space, or at least partially do so, when the amount and direction of the elongate member deformation so requires. In this situation, the base of one segment of a segment pair simply sweeps over or beneath the base of the other segment in use when the direction and amount of the required elongate member deformation requires it; this can easily be accommodated so that the two segments can occupy the large amount of common ground space needed to enable a 90 degrees relative displacement between the segments of the segment pair from an in-line relationship. The wall members of the segments also gain in proximity during this action and avoid a stall in deformation or its significant obstruction by a similar ability to sweep one over the other. Of course, with deformation in an opposite direction, the wall member and base lose rather than gain proximity.

In preferred elongate members, the segments connected by said first connection means are conveniently spaced apart such that, and said articulation has capacity to accommodate such a degree of displacement between next adjacent segments that, those segments can readily be re-oriented through a right angle or more, eg from 120 degrees to 180 degrees.

The spatial relationship between the first and second connection means and the first and second faces of the segments in a segment pair is significant. Thus, artificial lawn edging is preferred in which a window is defined in the elongate member, in said connection region, between the first connection means, the second connection means and opposed edges of the first faces or opposed edges of the second faces of each segment making up the segment pair, whereby the first connection means is separated from the second connection means across said window. In this manner, the separable region is identified to the user by its relationship in juxtaposition with said window. There could, of course, be two such windows, one defined between the first connection means, the second connection means and opposed edges of the first faces of each segment and one defined between the first connection means, the second connection means and opposed edges of the second faces of each segment.

The elongate member is normally made of a plastics material, for example polyethylene (normally MDPE or HDPE), polypropylene, an acetal homopolymer (POM-H) or copolymer (POM-C) or a polyamide such as Nylon-6. Nylon-6 is preferred for its combination of mechanical properties and cost and in addition because it has been shown to adhere well to substrates using conventional adhesives.

The elongate member is preferably made of an injection moulded nylon but other plastics materials, such as those exemplified above, could be used to make the elongate member by injection moulding.

Conveniently, all segments connected by a said first connection means are also provided with a said second connection means.

The elongate member is in a particularly preferred embodiment made of injection-moulded plastics material and comprises a succession of at least eight segments, each of which segments is connected to its next adjacent segment in the succession by a said connection means, and optionally one or more further segments each connected to its next adjacent said segment, each segment having a first face for receiving a perimeter edge portion of said artificial grass layer for fixture thereto, when the edging is in a boundary-located state, said faces each being provided, respectively, by a segment wall member and a segment base which are connected to form a cavity therebetween and to define an opening for admission to the cavity, in the lawn installation, of a perimeter portion of a lawn base layer in an overlying relationship thereof with said segment base and in an underlying supporting relationship with said wall member, each said cavity being open to that of the next adjacent segment across an inter-segmental region of the elongate member at which said segments are juxtaposed or face each other across the width of the elongate member, each of said second connection means comprising one or more separable regions of elongate member material which confers or, in the case of plural such separable regions, which together or individually are (is) responsible for applying, said flexibility restraint and said separable regions comprising regions of designated removable elongate member material whose designation is indicated by said so-designated regions having lesser thickness than surrounding regions of the elongate member, which in general have uniform thickness.

Other Particular Embodiments

The invention incudes within its scope the following four edging embodiments: An edging comprising a segmented elongate member in which each segment of a plurality of segments is connected to a next adjacent segment at a segment connection by connection means respective to that segment connection and comprising first connection means which comprises an articulation and second connection means which confers, by severable connection between the segments connected by said connection means, rigidity, or at least flexibility restraint, on the elongate member at the locality of said segment connection, and in which elongate member severance of the severable connection provided by any said second connection means permits deformation of the elongate member to take place, at the articulation of the connection means in which that second connection means is comprised, by relative displacement between the segments connected by said articulation, said deformation enabling the elongate member to follow at the locality of said articulation a non-linearity in a boundary between the artificial lawn and another landscape feature which non-linearity the elongate member could not follow without said severance;

An edging comprising an elongate member which comprises a plurality of segments connected, each with a next adjacent one of said segments, in spaced apart relationship at segment connections along the length of the elongate member, each segment having a segment base and an opposed wall member which respectively provide a segment base surface for seating upon and fixture to an upwardly-facing support surface of a sub-base layer underlying, in the lawn installation, the lawn base layer and an upwardly-facing wall member surface which forms in aggregate with the upwardly-facing wall member surface(s) of the other segment(s), in the lawn installation, a continuity of said lawn base layer support surface upon which said artificial grass layer can be laid for fixture at a said perimeter edge thereof so that it is both retained and supported by the upwardly-facing wall member surfaces of the elongate member in aggregate, in each segment the wall member and segment base being connected to form a cavity therebetween and to define an opening for admission to the cavity, in the lawn installation, of a perimeter portion of the lawn base layer in an overlying relationship thereof with said segment base and in an underlying supporting relationship with said wall member, each of one or more segment-to-segment connections comprising:—

(i) joining means in which segment articulation first connection means enables relative displacement in the plane of said sub-base layer surface, when the elongate member is disposed with the segments connected by that segment-to-segment connection seated by their segment bases upon said sub-base layer, between those connected segments to change the orientation of those segments relative to one another so that the length of the elongate member constituted by those segments can be deformed to follow the non-linear part of the boundary or (ii) joining means in which:

(a) segment articulation first connection means enables, subject to (b)(ii) below, relative displacement in the plane of said sub-base layer surface, when the elongate member is disposed with the segments connected by that segment-to-segment connection seated by their segment bases upon said sub-base layer, between those connected segments to change the orientation of those segments relative to one another so that the length of the elongate member constituted by those segments can be deformed to follow the non-linear part of the boundary and (b) further connection means supplements each of one or more of said so-articulated segment-to-segment connections and comprises in each case one or more severable connectors which substantially disable said relative displacement between segments connected by the articulation first connection means but permit it upon and following severance so that the length of the elongate member constituted by those displaceable segments can be deformed to follow the non-linear part of the boundary.

An artificial lawn edging for use in an artificial lawn installation, the artificial lawn installation comprising an artificial grass layer extending to form an artificial lawn between perimeter edges which terminate the artificial grass layer at a boundary thereof with another landscape surface, at least part of said boundary being non-linear and defined by said edging and the edging comprising an elongate member [made of a rigid material] segmented to provide a plurality of individual segments connected, each with an next adjacent one of said segments at segment connections along the length of the elongate member, each segment having a first face upon which to receive a perimeter edge portion of said artificial grass layer for fixture to said face in termination thereof and a second face for engagement with a ground-support surface for the elongate member, at least one of said segments being connected at a next adjacent segment by connection means provided at a connection region of the elongate member and comprising articulation connection means comprising an articulation connecting each said segment to a next adjacent segment whereby the so-articulated segments can be displaced one in relation to the other at said articulation to deform the elongate member laterally at said connection region so as to follow the non-linearity of said boundary when said edging is disposed at said boundary and said second face is disposed upon said ground-support surface for receiving said perimeter edge portion of said artificial grass layer on said first face in termination thereof; and A modification of the artificial lawn edging as described above wherein further connection means are provided comprising one or more rigidity-conferring connectors further connecting together at least two segments connected together by said articulation connection means to confer rigidity across the connection region at which said so-connected segments are connected to restrain or prevent the lateral deformation of said elongate member at said segment connection, said elongate member being adaptable to dis-apply the rigidity conferred by said connectors to enable said prevented lateral deformation of said elongate member at said segment connection but said lateral deformation being prevented unless and until said elongate member has been so-adapted.

An artificial lawn installation comprising an artificial grass layer layered upon a support surface of a lawn base and extending to form an artificial lawn between perimeter edges at least part of which terminate the artificial grass layer at an edging member defining a non-linear boundary between the artificial lawn and another landscape surface, the edging member having an elongate form which is optionally comprised of plural segments in a segment succession in which each segment is connected to a next adjacent segment in the succession (for example in spaced part relationship), said edging member having lower and upper opposed wall members which respectively provide along the length of the elongate member a continuous or discontinuous downwardly-facing elongate surface forming a seat by which the elongate member is seated a support sub-surface of the lawn base and a continuous or discontinuous upwardly-facing elongate surface forming a continuity of said support surface and over which said artificial grass layer is adhered or otherwise fixed at a said edge thereof, the upper wall member being connected to the lower wall member to form an elongate channel therebetween which underlies said fixed artificial grass layer edge and has received therein the material of the lawn base layered between the sub-surface and said artificial grass layer, said elongate member being flexible in the plane of said downwardly-facing elongate surface whereby the edging conforms to the non-linear boundary between said artificial grass layer and said other landscape surface and said edging optionally being in the form of an elongate member comprised of plural segments in a segment succession in which each segment is connected to a next adjacent segment in the succession, for example in spaced part relationship, and has a segment lower wall member and a segment upper wall member which, respectively, form in aggregate with those of other segments, said lower and upper opposed wall members of the elongate member.

In each of the further edging embodiments just described, the edging may have any one or more of the features referred to hereinbefore.

In a second aspect, the invention provides (1) a method of edging an artificial lawn area at the boundary thereof with another landscape feature wherein the edging used is edging according to the invention and (2) a method of installing an artificial lawn in which method edging according to the invention is installed at the boundary of the artificial lawn area with another landscape feature.

In particular, with respect to (1) above, a method of edging a laid artificial lawn area is provided by the invention which method comprises (i) providing an edging of any of the forms and with any of the features hereinbefore described, (ii) lifting an edge portion of the artificial lawn layer at said boundary, (iii) if required to expose a ground surface to support the edging, carrying out an excavation local to the boundary to expose that ground surface before or after Step (ii) and, before or after Step (iii), (iv) disposing the second face of the elongate member of said edging on said ground surface so that the edging is in a position and orientation to receive said lifted artificial grass layer edge portion on said first face of the elongate member of the edging, taking into account any non-linearities in the boundary, the elongate member, if there are any non-linearities in the boundary, having been made ready for deployment by segment re-orientation necessary for the elongate member deformation needed for said elongate member to follow said boundary, said segment re-orientation following action to disapply any flexibility restraint applied to the elongate member up until that time, (v) fixing the elongate member to the ground surface and (vi) fixing the lifted artificial grass layer edge portion upon the elongate member.

Further, with respect to (2) above, the invention in particular includes within its scope a method of installing an artificial lawn which method comprises providing an artificial lawn layer, a lawn base, a sub-base underlying the lawn base and an edging of any of the forms and with any of the features hereinbefore described, disposing the artificial lawn layer upon a support surface of the lawn base to form an artificial lawn between perimeter edges which terminate the artificial grass layer and lawn base support surface at a boundary thereof with another landscape feature, the edging being fixed to the sub-base at said boundary and, if there are any non-linearities in the boundary, having been previously made ready for deployment by segment re-orientation necessary for the elongate member deformation needed for said elongate member to follow said boundary, said segment re-orientation following action to disapply any flexibility restraint applied to the elongate member up until that time, and fixing the artificial lawn layer to said fixed edging.

The combination as a kit of:
(i) a sheet of artificial grass and
(ii) an edging of any of the forms and with any of the features hereinbefore described, Is also included within the scope of the invention.

Further, included within the scope of the invention is also an artificial lawn installation in which an edging according to the invention is used; and, in particular, such an installation may comprise a sub-base layer spread over a natural or artificial ground surface, an artificial lawn support layer provided over the upwardly-facing surface of said sub-base layer and providing a support surface for an artificial lawn, an artificial grass layer provided over the support surface of the lawn support layer and extending to form an artificial lawn between perimeter edges which terminate the artificial grass layer and the lawn support surface at a boundary thereof with another landscape surface and an edging for said artificial lawn layer, the edging comprising an elongate member in which each segment of a plurality of individual segments is connected to its next adjacent said segment(s), each segment having a first member having an upwardly-facing first segment face on which is received a perimeter edge portion of said artificial grass layer for fixture thereto, a second member having a downwardly-facing second segment face which is disposed upon and fixed to the upwardly-facing surface of said sub-base layer at said boundary, and a space between said first and second members in which a perimeter edge portion of said lawn support layer is received in underlying supporting relationship with said first member and said artificial grass layer.

The elongate member is preferably a segmented elongate member in which each segment of a plurality of eight individual segments is connected to its next adjacent said segment(s).

The boundary referred to above may include a non-linearity and the segments of at least a pair of next adjacent segments of said plurality of segments are preferably connected together at a segment connection by connection means respective to that segment connection and provided at a connection region of said elongate member, said connection means comprising an articulation connecting together said segments of said segment pair enabling relative displacement between the so-articulated segments at said articulation in order to deform said elongate member at said connection region so that said installed elongate member follows said non-linearity in said boundary.

The elongate member used in the methods of the invention and in the lawn installation of the invention is conveniently one derived from one in which said connection means comprises first connection means which comprises an articulation connecting together said segments of said segment pair and second connection means which applies, by severable further connection between those segments, flexibility restraint across the connection region at which said segments are connected, said first connection means enabling, except if and to the extent that said flexibility restraint is applied across said connection region, relative displacement between the so-articulated segments at said articulation to deform said elongate member at said connection region so that said elongate member can follow a non-linearity in said boundary.

Whilst in general, the elongate member in any embodiment of the invention will normally be composed of segments forming a succession between opposed elongate member ends, an endless loop form of the elongate member eg as manufactured, with flexibility restraint applied, can also be envisaged which would, of course, normally need to be cut for use to provide opposed ends.

Other Embodiments and Aspects of the invention

In addition to the invention as described hereinbefore, the invention provides an apparatus for securing a perimeter of an artificial lawn covering, the apparatus comprising an elongate member comprising a first end and an opposed second end; a base portion providing a first contact surface configured to abut a support surface; an opposed upper portion providing a second contact surface configured to receive a portion of a lawn covering; and an abutment member extending therebetween defining an outer abutment surface configured to abut a wall or fence, and an inner abutment surface; in which the elongate member defines a channel extending between the base portion, the opposed upper portion and the inner abutment surface, in which the channel is configured to receive ground material.

The elongate member may be composed of a flexible material, such as for example injection moulded plastic. In one embodiment, one or more of the base portion, upper portion, and/or abutment portion may be composed of injection moulded plastics material.

The elongate member preferably defines a longitudinal axis extending between the first and second ends thereof.

In one embodiment, the base portion comprises a plurality of spaced apart base flanges aligned along the length of the elongate member.

In one embodiment, the upper portion comprises a plurality of spaced apart upper portion members aligned along the length of the elongate member.

The plurality of base flanges and upper portion members provides the elongate member with a degree of flexibility and manoeuvrability enabling the elongate member to be manipulated into any desired curved shape.

The apparatus may further comprise one or more spacer portions located between adjacent pairs of base flanges or between adjacent pairs of upper portion members.

The spacer portions preferably provide the elongate member with a degree of flexibility and manoeuvrability. Preferably, the elongate member is formed of a material which can be easily cut to a predetermined length. Preferably, the spacer portions enable the elongate member to be easily cut between adjacent pairs of upper portions and base flanges.

The base portion may be engaged to the support surface using any suitable means of attachment. In one embodiment, the base portion or one or more of the base flanges may further comprise an aperture configured to receive an attachment member, such as for example a nail or screw, for securing the base portion or base flange to a support surface.

The lawn covering may be attached to the second contact surface of the elongate member using any suitable attachment means. In one embodiment, the apparatus may further comprise an adhesive layer located on the second contact surface.

The invention further provides in an additional aspect a kit for securing a perimeter of an artificial lawn covering, the kit comprising an apparatus as defined above in this headed section of this specification, a lawn covering (eg of an artificial grass layer); and/or adhesive configured to be applied to the second contact surface for engaging the lawn covering; and/or attachment means configured to secure the first contact surface of the base portion to the support surface.

The invention still further provides a method for securing a perimeter of an artificial lawn covering using an apparatus as defined above in this headed section, the method for example comprising obtaining an elongate member as described herein; cutting the elongate member to a desired length; placing the first contact surface upon a support surface; optionally securing the first contact surface of the base portion of the elongate member in position with one or more attachment means; optionally applying an adhesive layer to the second contact surface of the upper portion of the elongate member; depositing a ground material within the channel of the elongate member; and securing an artificial lawn covering to the second contact surface.

The invention will now be described, by way of example only, reference being made to the accompanying drawings which show the edging of the invention (in each of its two conditions) and its use in installing an artificial lawn installation. In the accompanying drawings.

Figure 4A:
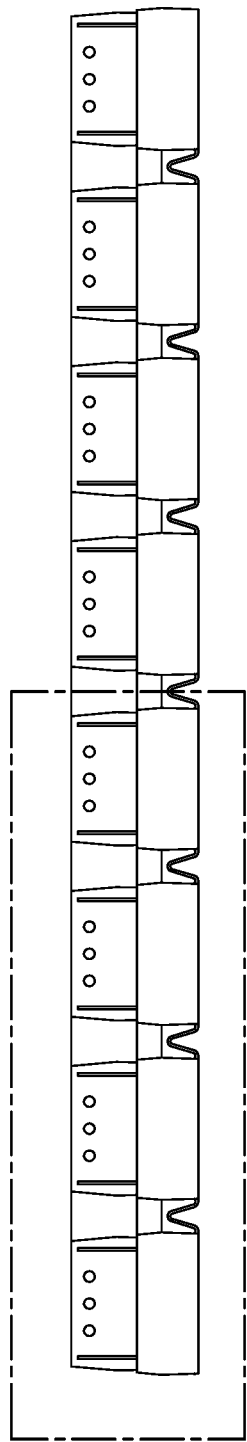
FIG. 4 shows an edging according to a preferred embodiment of the invention, the Figure comprising four separate drawings.
Figure 4B:
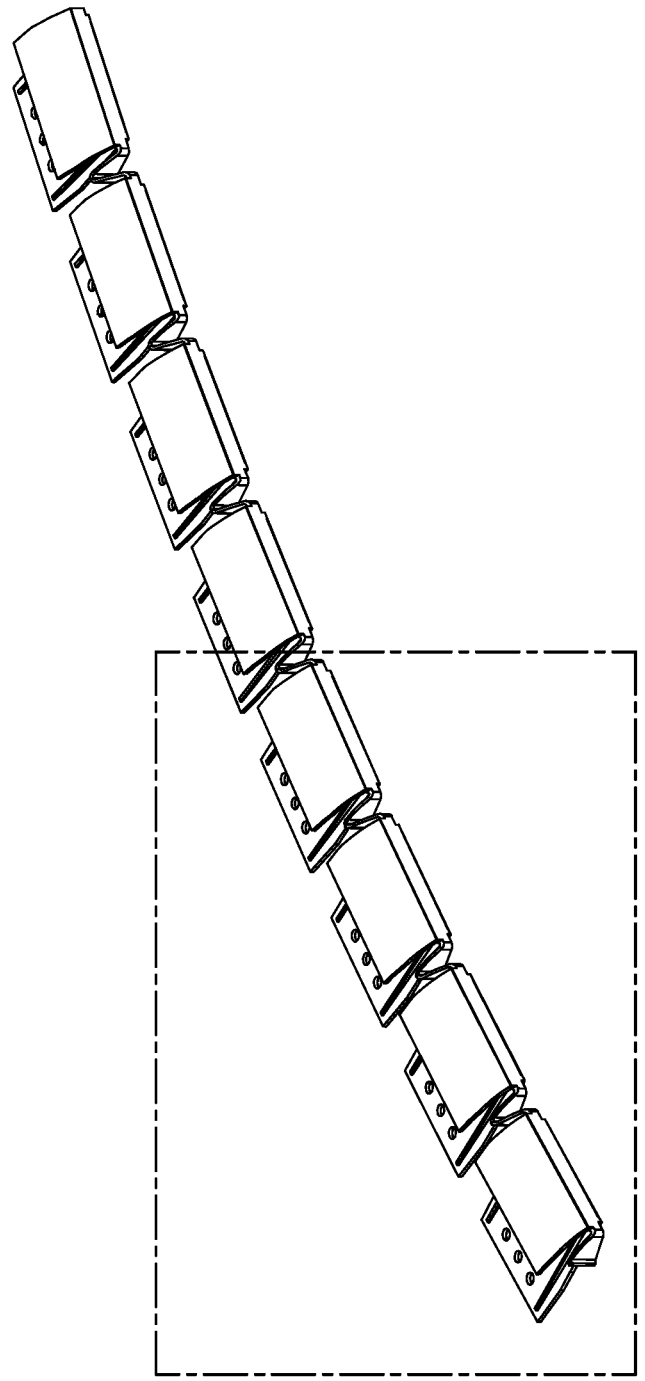
Figure 6A:
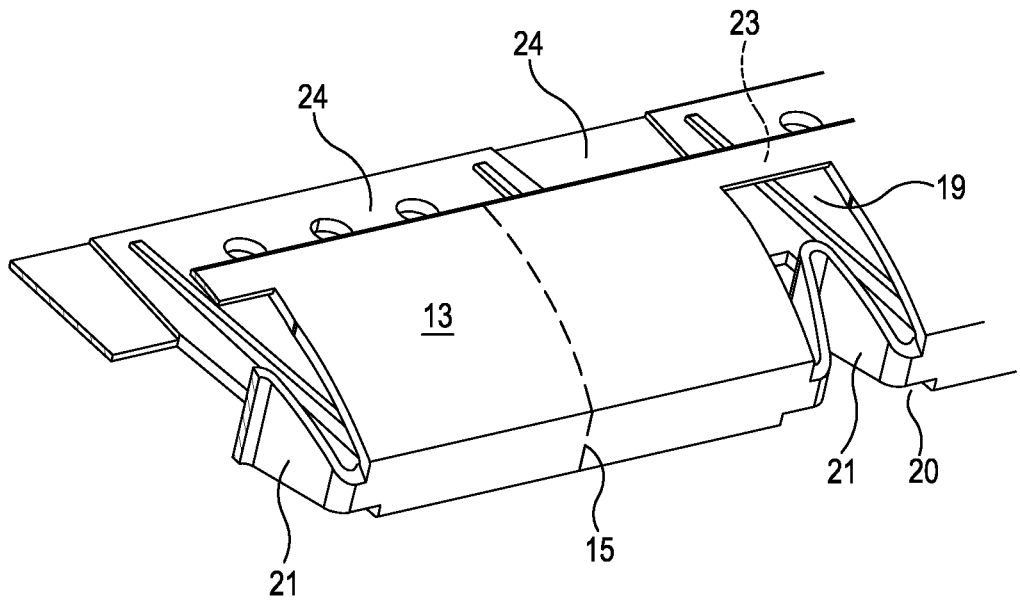
Figure 6B:
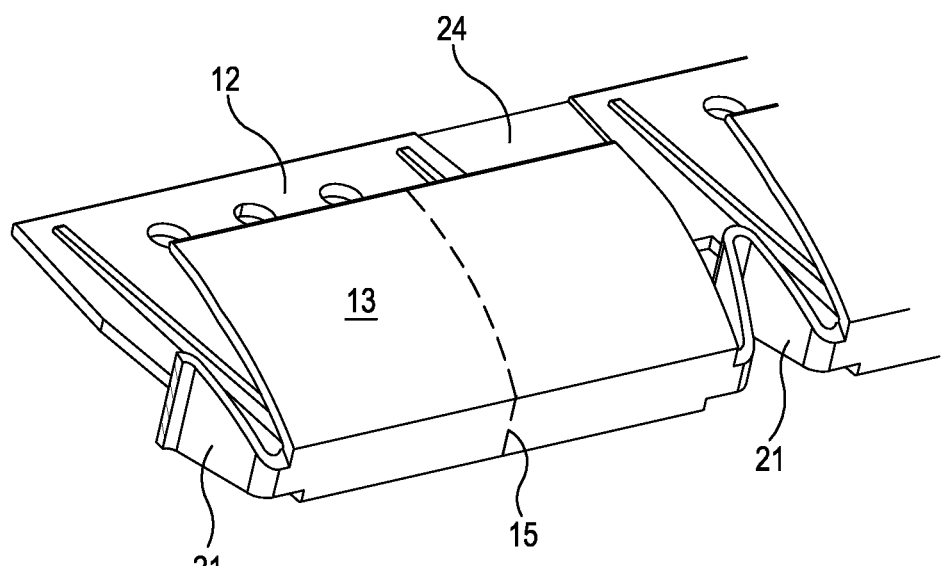
Figure 7:
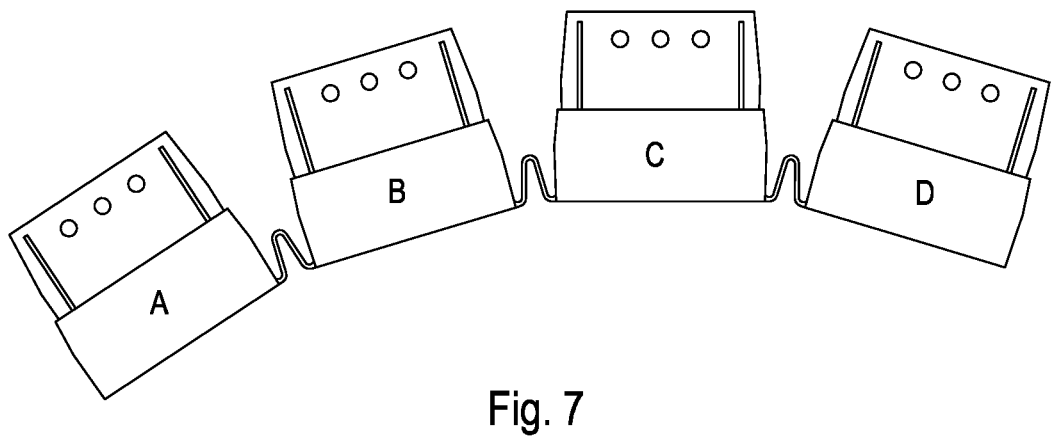
Figure 8:
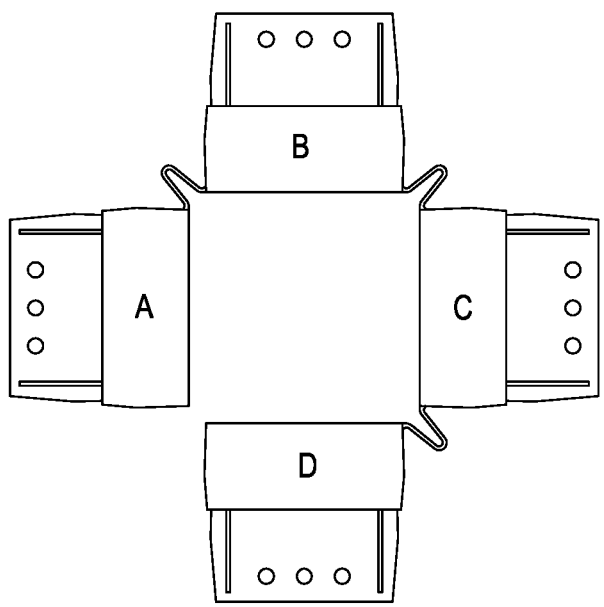
Figure 9:
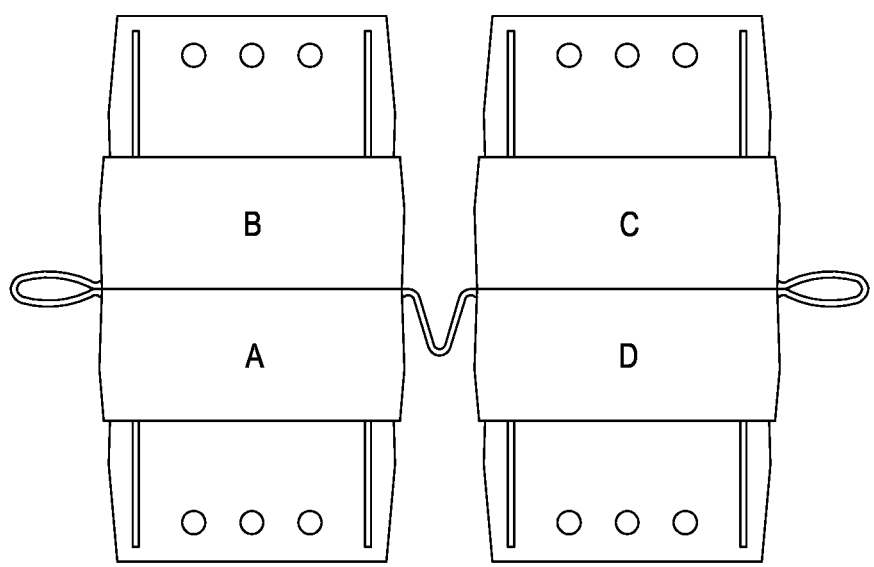
Figure 10:
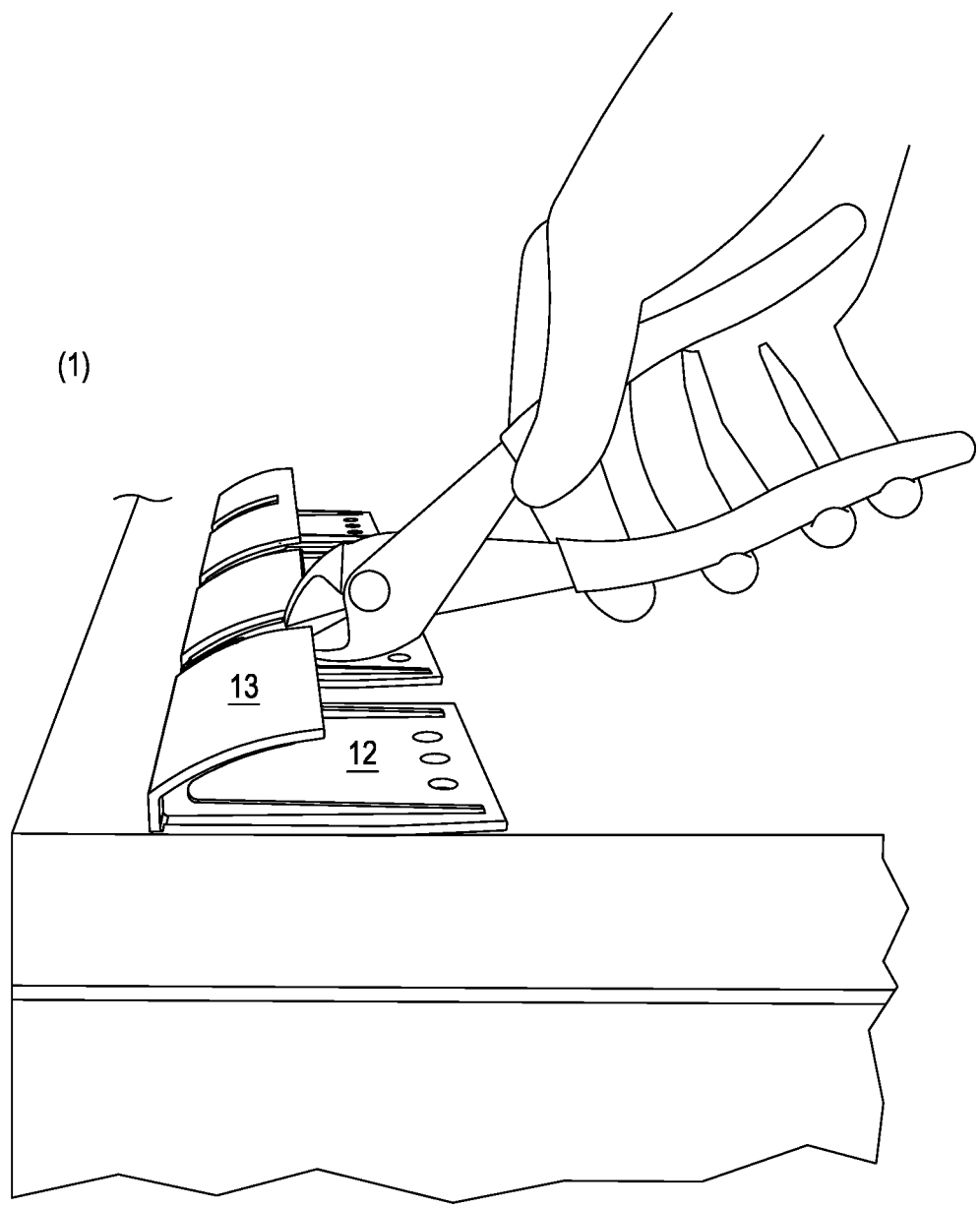
Figure 10:
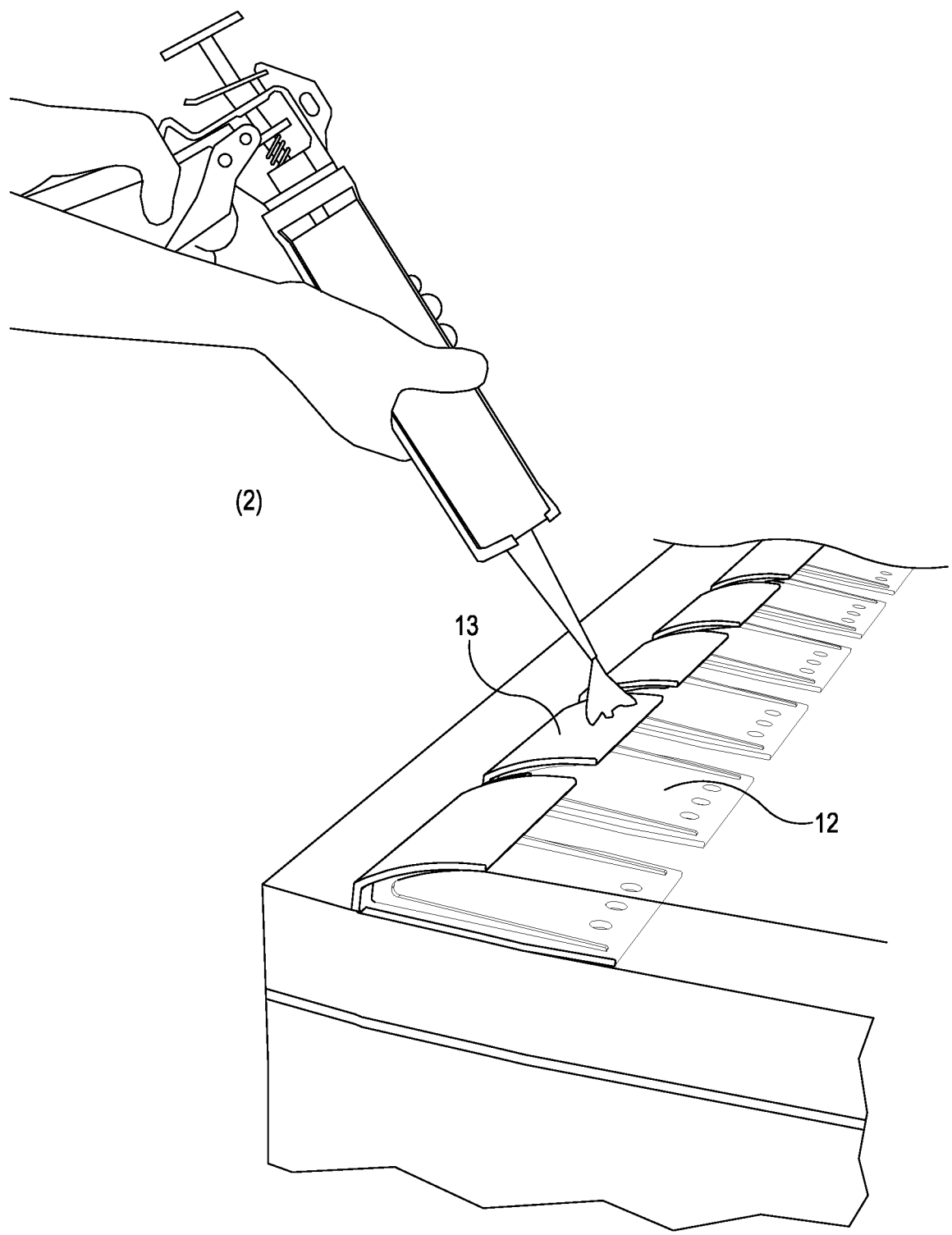
Figure 10:
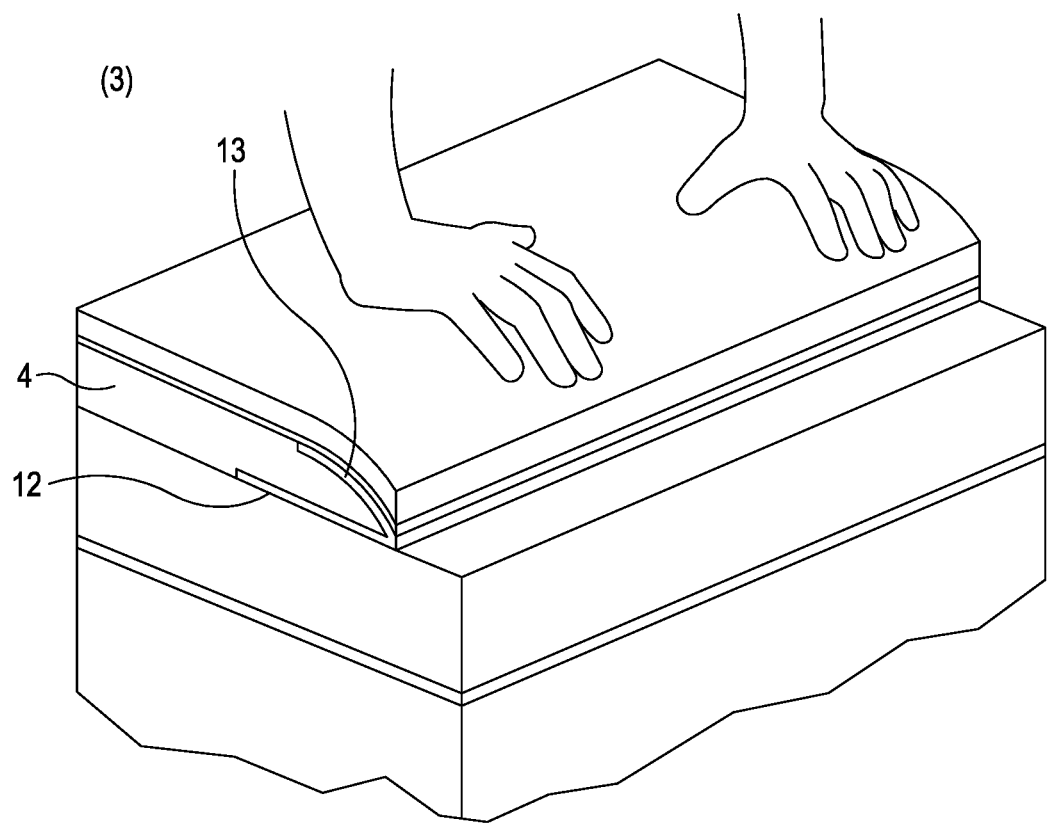
Figure 11:
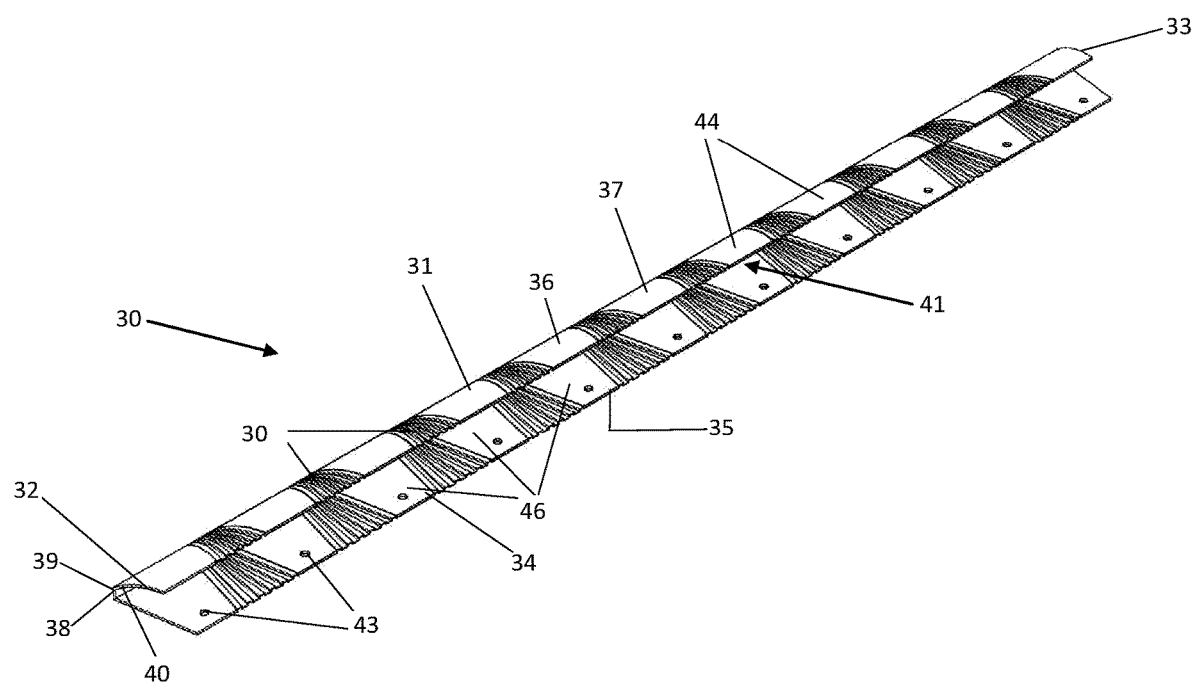
Figure 12:
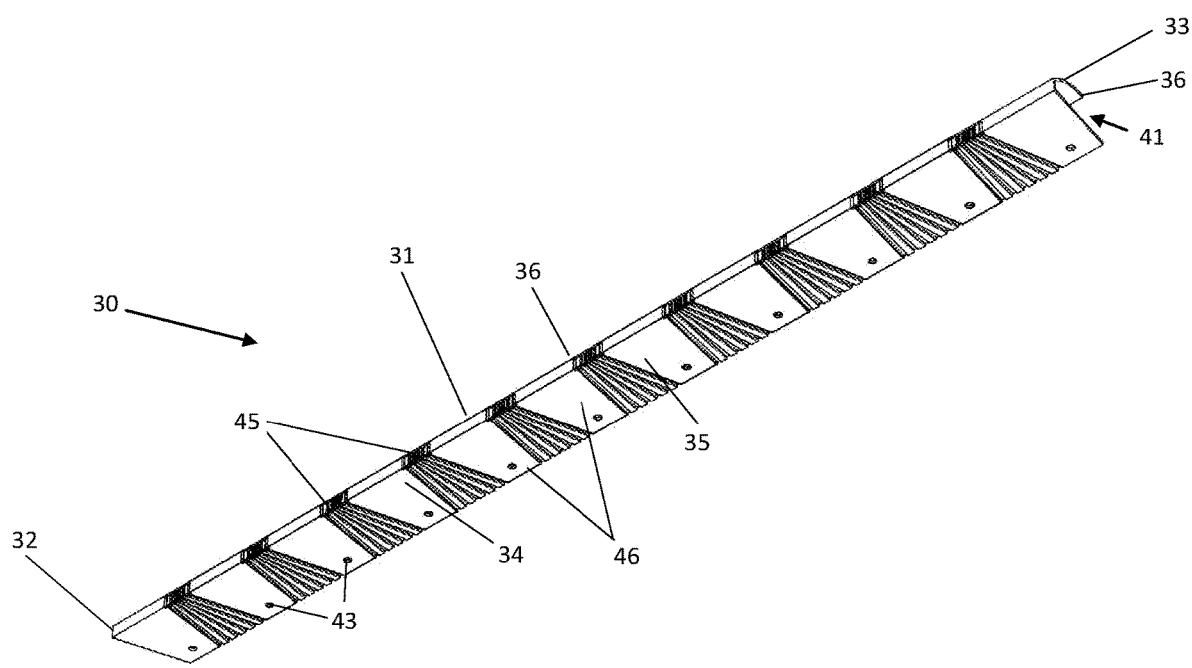

FIG. 4A, which shows in plan the edging in the form in which it is manufactured and shipped from point of sale to the user;

FIG. 4B, which shows the edging in a perspective view from above, one side and one end in the form in which it is ready for deployment by the user prior to the deformation needed to accommodate a non-linear boundary between an artificial lawn and another landscape feature, the edging as shown already following a nominally curved line;

FIG. 4C, which shows from the same perspective as that of FIG. 4B the sequence of four edging segments which are depicted within the rectangular view port shown at the left hand side of FIG. 4A; and FIG. 4D, which shows from the same perspective as that of FIG. 4C (but without curvature) the sequence of four edging segments which are depicted within the rectangular view port shown at the left hand side of FIG. 4B;

FIG. 5 shows perspective views from above, the other side and the other end of an edging according to a preferred embodiment of the invention, the Figure comprising two separate drawings:

FIG. 5A, which shows the edging depicted in FIG. 4C from this different perspective (shipped form of the edging); and FIG. 5B, which shows the edging depicted in FIG. 4D from this different perspective (deployment-ready form of the edging);

FIG. 6 shows partial perspective cross-sectioned views from above and one side of an edging according to a preferred embodiment of the invention, the Figure comprising two separate drawings:

FIG. 6A, which shows the edging cross-sectioned along the line I-I of FIG. 4A, the edging being in the form in which it is manufactured and shipped from point of sale to the user; and FIG. 6B, which shows the edging cross-sectioned along the line 11-11 of FIG. 4B, the edging being in the form in which it is ready for deployment by the user prior to deformation to accommodate a non-linear boundary between an artificial lawn and another landscape feature;

FIG. 7 is a first depiction of a four-segment section of a preferred embodiment edging described hereinafter, demonstrating the capacity of the edging to accept deformation enabling it to be used to form a non-linear boundary of an artificial grass layer and another landscape feature;

FIG. 8 is a second depiction of the same four-segment section, demonstrating capacity of the edging to accept a higher level of deformation than depicted in FIG. 7;

FIG. 9 is a third depiction of the same four-segment section as is shown in FIGS. 7 and 8, demonstrating capacity of the edging to accept an even higher level of deformation than depicted in FIG. 8;

FIG. 10 shows graphically in simple terms a sequence of operations which can be applied to install an artificial grass lawn installation using the preferred embodiment edging of the invention described hereinafter;

FIG. 11 is a top side perspective view which shows an alternative embodiment of the invention in which the edging has a different form to the edging shown in the previous Figures; and FIG. 12 is a bottom side perspective view which shows the same alternative embodiment of the invention as shown in FIG. 11.

Various dimensions have been indicated in the following description. However, it should be noted that the Figures of the drawings have been prepared as illustrations without attempting to reflect those dimensions, or any dimensions, in them. Thus, for example, FIGS. 1 to 3 illustrate the layered structure of an artificial lawn edged with an embodiment of the edging according to the invention; however, the dimensions in which the various layers and other features have been illustrated are not intended to represent the dimensions or relative dimensions of those details.

Figure 1:
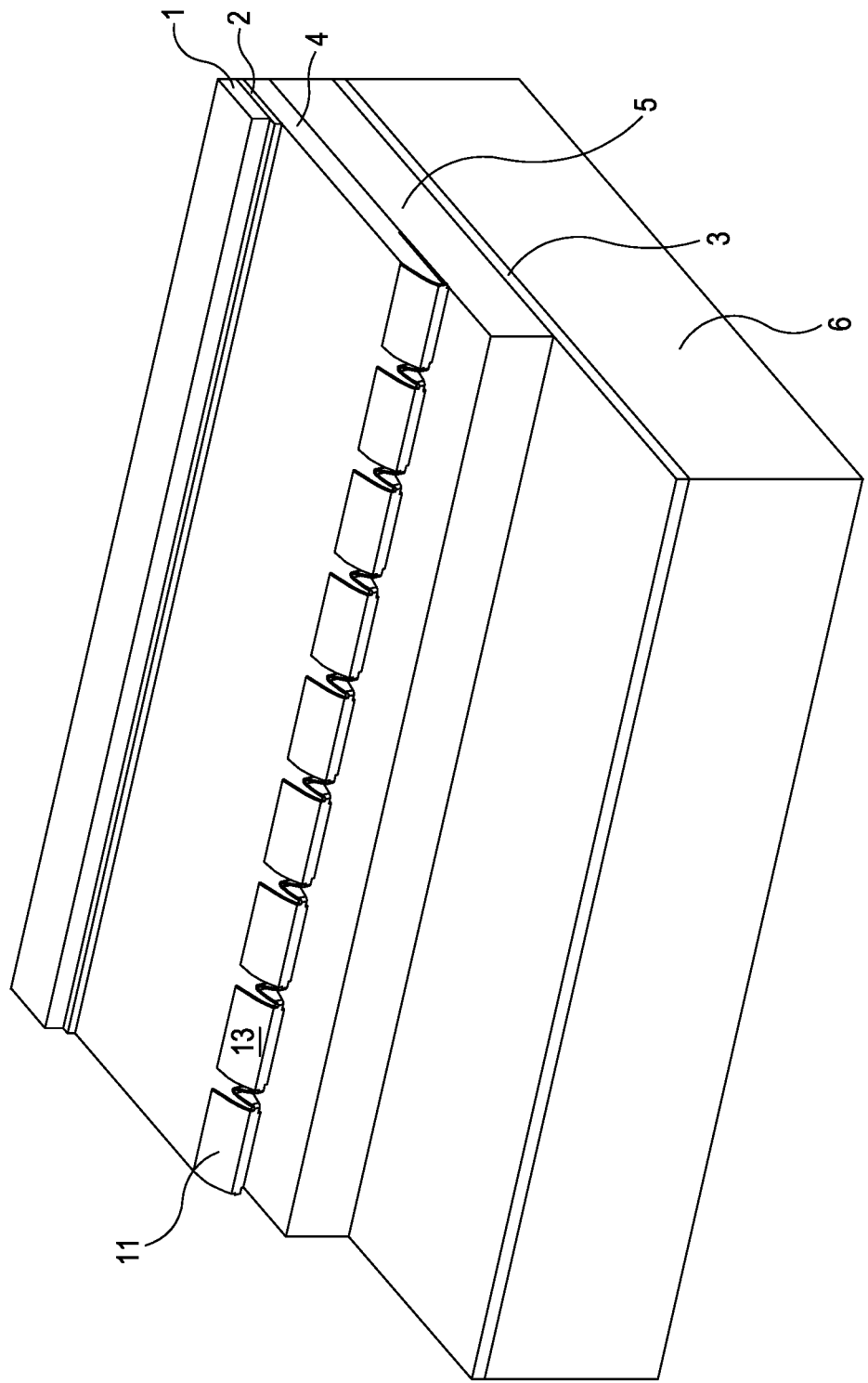
FIG. 1 is a perspective sectional view which shows an artificial lawn installation which includes an edging according to the preferred embodiment of the invention described hereinafter.

Referring first to FIG. 1, the lawn installation there depicted comprises an artificial grass layer 1 of a conventional form and constitution well-known in the art comprising a backing sheet 2, typically of latex, from which rise artificial grass filaments whose bases are embedded in or otherwise fixed to the backing sheet. In general, the upper surface of the artificial grass layer 1 will be over-sown with a sand infill which covers the latex sheet. A membrane 3 made of geotextile is laid on the ground/soil base 6. A compacted layer of Type 1 MOT or similar material is spread over the geotextile membrane 3; Type 1 MOT is a UK designation for a graded aggregate having particles sized between 1 and 40 mm. The particulate granite lawn base layer 4 is a compacted layer made up of granite dust. Layer 4 terminates at the perimeter of the lawn represented by edging described in detail below with reference to FIGS. 4, 5 and 6. The edging receives a perimeter edge portion of the lawn base layer 4, which underlies and supports the arcuate top wall 13 of elongate strip 11 of the lawn edging.

Figure 2:
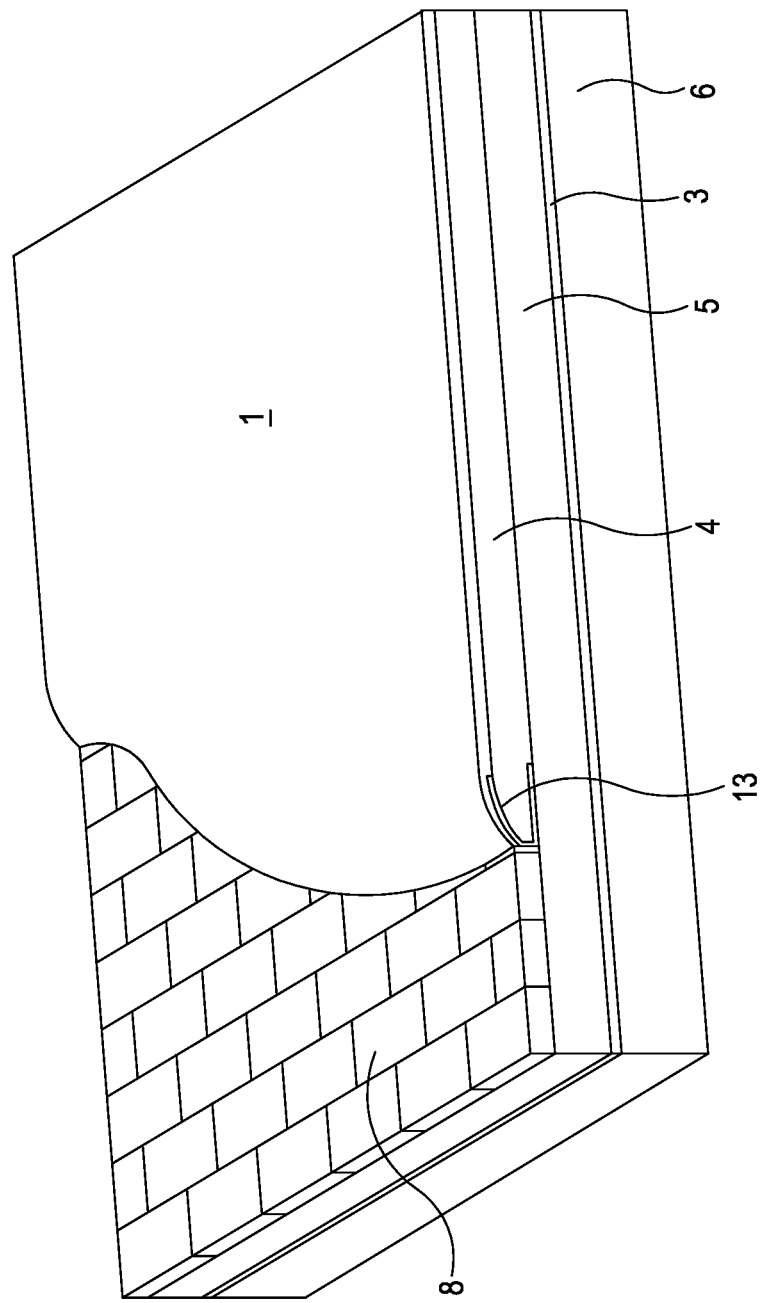
FIG. 2 is a perspective elevation of an artificial lawn installation as shown in FIG. 1 in which the artificial lawn has a non-linear (curving) boundary with a hard landscaped area (in this case brick paviors), an edging according to the preferred embodiment of the invention described hereinafter defining the boundary.
Figure 3:
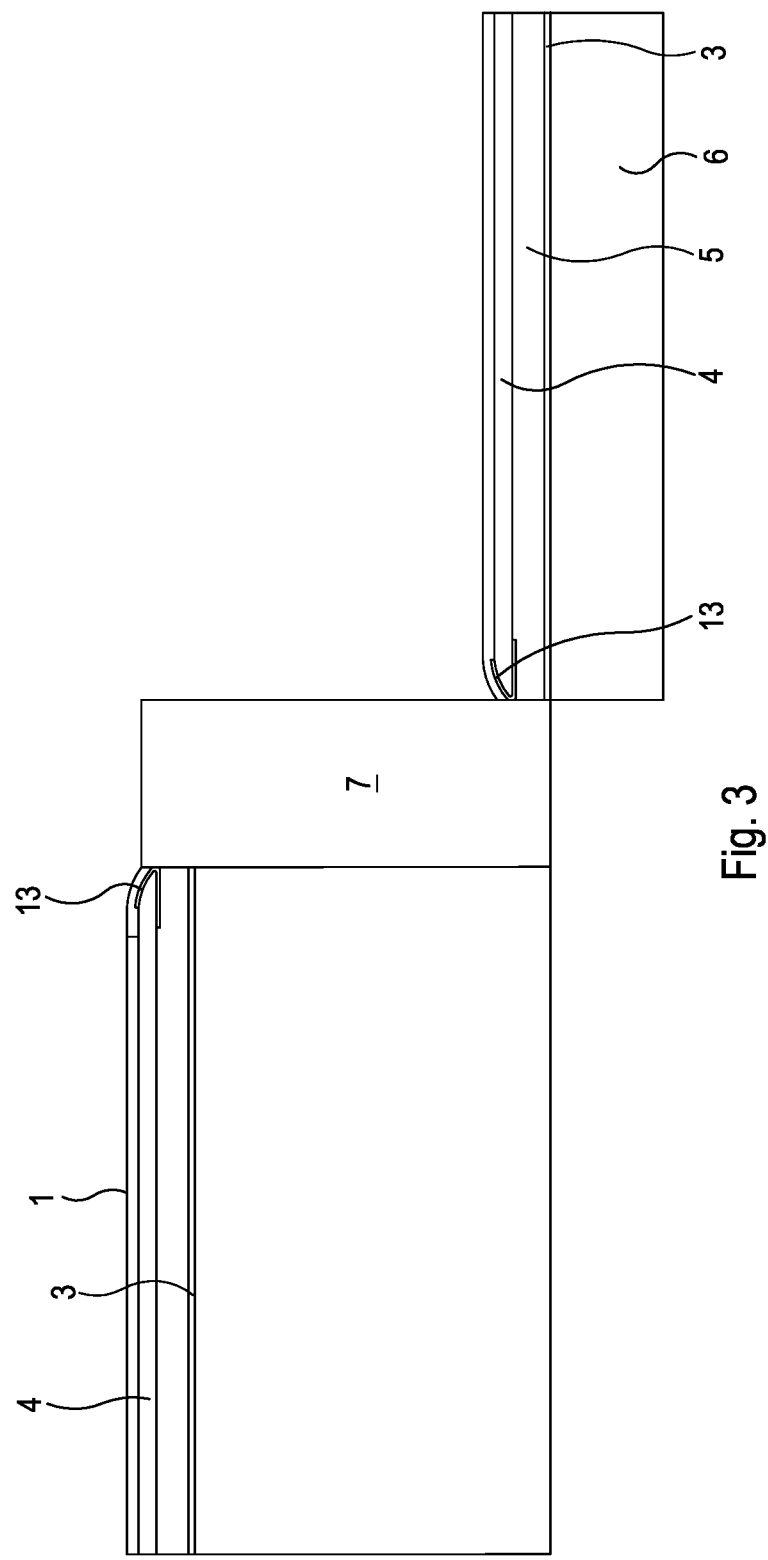
FIG. 3 is a perspective elevation of an artificial lawn installation as shown in FIG. 1 in which areas of artificial lawn have respective linear boundaries with a dwarf wall separating landscape levels of different height, edgings according to the preferred embodiment of the invention described hereinafter defining the boundary in both cases.

FIGS. 2 and 3 show elongate strip 11 of the edging used to define, respectively, a non-linear boundary between an area of artificial grass 1 and a further landscape feature consisting of a paviored area 8 and a linear boundary between first and second areas of artificial grass 1 and a further landscape feature consisting of a dwarf wall 7. In the case of FIG. 3, the dwarf wall 7 itself may be regarded as a separate landscape feature, could be non-linear (eg having a curved portion or a returning straight section joined to the straight section shown) and could represent a property boundary.

Referring to FIGS. 4 and 5, the edging comprises an elongate strip designated generally by reference numeral 11 and made of an engineering grade polyamide such as Nylon-6 (eg as marketed under the name Alphalon 27) by plastics injection moulding, other plastics materials also being suitable as alternatives as explained hereinbefore. As shown, the strip 11 is segmented, and from FIGS. 4A and 4B it will be seen that the elongate strip 11 is comprised of a total of eight segments, these making up a 750 mm run from one end of the strip 11 to the other. FIGS. 4C, 4D, 5A and 5B show only the four segments 11A indicated in the view port shown in FIGS. 4A and 4B.

Each segment 11A of elongate strip 11 comprises a generally flat base plate 12 and an arcuate upperwall member 13 extending from a lip 14 at one lateral extremity to a junction at end wall 15 with the base plate 12 at the other. Each segment 11A is strengthened by ribs. First, a pair of ribs 16 traverse the flat upwardly-facing surface of the base plate 12 as shown. Secondly, a third rib 17 (shown in broken lines in FIGS. 4C, 4D 5 and 6 only) extends from a point near to the previously mentioned junction at end wall 15 onto the underside of arcuate upper wall member 13. Rib 17 suffers a reduction in thickness as it reaches the lip 14. Bores 18 in base plate 12 are provided for passage of long fixings such as nails (not shown) through into the sub-base 7 (FIGS. 1 and 2).

The mould used for the injection moulding of elongate member 11 is one which has been selectively acid-etched to provide a textured surface which is reproduced on the face of arcuate upper wall member 13 to provide improved adhesion of the adhesive applied to adhere the artificial grass layer 1 to the elongate member 11 (see the description below with reference to FIG. 10).

As shown in FIGS. 4A, 4C, 5A and 6A, the "as manufactured" elongate strip 11 is rigid. Arcuate upper wall member 13 of each segment 11A is formed with an opening or window 19 (FIGS. 4C, 5A and 6A) adjacent the end wall 15, whilst base plate 12 is formed with an opening or window 20 also adjacent end wall 15 (also FIGS. 4C, 5A and 6A). A resiliently flexible plastics hinge 21 which is integral with end wall 15 provides continuity of that end wall whilst also interrupting its linearity to form a V-configuration; the openings 19 and 20 otherwise form a continuum which straddles the end wall 15. In cross-section of the strip 11, as best appreciated from FIG. 6, base plate 12 and arcuate upper wall member 13 together form the approximate outline of a chevron and define a cavity 22 which in use of the edging receives a perimeter edge portion of the lawn base layer 4; lawn base layer 4 then underlies and supports the arcuate upper wall member 13.

Continuing to refer to FIGS. 4C and 5A, there are associated with openings 19 and 20 the cut-outs 23 and 24, which are provided, respectively, in the downwardly-facing surface of arcuate upper wall member 13 and in the upwardly-facing surface of base plate 12. The presence of these cut-outs is responsible for applying the previously mentioned rigidity of the elongate strip 11 shown in FIGS. 4A, 4C and 5A. Each of cut-outs 23 and 24 are formed in the elongate strip 11 as regions of lesser thickness (1 mm) than the gauge of the surrounding moulding (2 mm), so facilitating their removal from the elongate strip 11 by use of a hand cutting tool such as snips or scissors to cut them out. Cutting them out disapplies the rigidity to convert the elongate member to its "deployment form".

FIGS. 4D and 5B show the elongate strip 11 in its deployment form in which it is flexible rather than rigid. Upon removal of cut-outs 23 and 24, the segments 11A of elongate strip 11 remain connected to one another by the resiliently flexible plastics hinge 21 which is integral with end wall 15, but they are otherwise unconnected. In the condition of the elongate strip shown in FIGS. 4D and 5B, openings 19 and 20 essentially circumvent the width of the elongate strip 11, interrupted only by the resiliently flexible plastics hinge 21. Plastics hinge 21 ensures that the segments remain part of the elongate strip 11 but permits their displacement relative to one another in a broadly rotational movement at the crutch of the V-configuration. Although shown in FIGS. 4B, 4D, 5B and 6B with all cut-out pairs 23,24 removed, this serves as illustration only and in use one 23,24 pair may be cut out and either none of the other pairs or one or more of the other pairs.

Each segment in the manufactured condition of the elongate strip 11 is connected to the next adjacent segment by (1) cuts-outs 23 and 24 and (2) resiliently flexible plastics hinge 21 at the connection region. Further, each segment in the deployed condition of the elongate strip 11 is connected to the next adjacent segment by a resiliently flexible plastics hinge 21 only. It is, of course, possible to construct the elongate strip 11 with only some segments provided with a plastics hinge 21, cut-outs 23 and 24 then remaining at the connection regions of the segments not so provided if other means of rigid connection is not provided.

In use of the edging shown in FIGS. 1 to 9 of the drawings in constructing an artificial lawn installation, the process to be followed is shown in the sequence of depictions set out in FIG. 10.

An eight-segment length of edging as shown in the preceding drawings is first provided. The method is then as follows:

1. Flatten and prepare the ground over which the artificial grass layer is to be applied, lay the geotextile membrane 3 and then lay the MOT Type 1 graded aggregate layer 5 (sub-base). Compact layer 5 to a thickness of 50-100 mm.

2. Trim the edging to the correct length needed, if it is too long, and remove those of cut-outs 23 and 24 which are required in order to enable the required deformation of the elongate strip 11.

3. Position the elongate strip 11 on sub-base layer 5 and nail to fix in place after the necessary deformation of strip 11 to fit the desired boundary line, the nails being received in the compacted aggregate sub-base layer 5. Lay the granite layer 4, compacting the material and filling the cavity 22 of the elongate strip 11, layer 4 including the placed in-filling being shown in the last of the depictions shown in FIG. 10 and, diagrammatically in outline only, in the second depiction.

4. Cut the artificial grass layer 1 to the perimeter line and pull back from the arcuate upper wall member 13.

5. Spread a layer of adhesive upon the upwardly-facing surface of arcuate upper wall member 13.

6. Lay the artificial grass layer 1 onto the upwardly-facing surface of the arcuate upper wall member 13 already provided with adhesive, dressing it over the arcuate upper wall member 13 and pressing it down manually to ensure adhesion. Care must be taken to ensure that the perimeter of layer 1 is tucked down between the adjacent landscape surface (which might eg be a pathway or a paved area) and the edge of the elongate member 11.

Flexibility allowing the elongate strip 11 to deform to a boundary is an important feature of the invention and in FIGS. 7, 8 and 9 this important property is depicted. In FIG. 7, four segments are shown as re-oriented to a configuration with a concave radius of the order commonly found in artificial lawn areas; four segments only are shown for illustration purposes although in practice of the invention, a significantly larger number of segments will usually be present as this makes for efficient installation processes as well as convenient storage and carriage as well as general handling convenience.

In FIG. 8, the same four segments have each been rotated further (to a total of 90 degrees) relative to their in-line configuration; as it will be seen, the face of each segment end wall 15 is at a right angle to the face of the end wall 15 of the next adjacent segment. However, FIG. 8 ins intended to demonstrate flexibility rather than circumstances which would be likely to occur frequently in practice.

With reference to FIG. 7, the curvature could, of course, be convex instead of concave as shown in that Figure. Depending on the radius of the convex curvature, the base plates 12 of adjacent segments or the base plates 12 and the arcuate upper wall members 13 of adjacent segments would partially sweep, respectively, one over the other (ie one base plate 12 over another base plate 12 and one arcuate upper wall members 13 over another arcuate upper wall members 13) to accommodate the rotation of the segments and their overlapping. If the segments were to be rotated relative to one another through a total of 90 degrees relative to their in-line configuration (which would be the analogue of the overlap shown in FIG. 8), then the face of the segment end wall 15 of each segment would again be at a right angle to that of the next adjacent segment. In this condition, the base plates 12 would overlap by about 70%. The arcuate upper wall members 13 would overlap only slightly, although minor clipping of this component may be desirable in order to accommodate an overlying artificial grass sheet in a neat manner.

Further to the depiction shown in FIG. 8. FIG. 9 serves to illustrate the flexibility of the edging of the invention, in this case the same four segments having suffered rotation in the same direction as in the case of FIG. 8 through 180 degrees without damage.

With reference to FIGS. 11 and 12, the apparatus 30 for securing a perimeter of a lawn covering, comprises an elongate member 31 comprising a first end 32 and an opposed second end 33. The elongate member 31 further comprises a base portion 34 providing a first contact surface 35 configured to abut a support surface (not shown). The elongate member 31 further comprises an opposed upper portion 36 providing a second contact surface 37 configured to receive a portion of a lawn covering (not shown). The elongate member 31 further comprises an abutment member 38 extending therebetween defining an outer abutment surface 39 configured to abut a wall or fence, and an inner abutment surface 40. A channel 41 extends between the base portion 34, the opposed upper portion 36 and the inner abutment surface 232.

The elongate member is composed of injection moulded plastics material such as exemplified previously herein.

The base portion 34 is provided by a plurality of spaced apart base flanges 46 aligned along the length of the elongate member 31. Each base flange provides an aperture 43 for receiving an attachment member to secure the elongate member 31 to a contact surface. The upper portion 36 is provided by a plurality of spaced apart upper portion members 44 aligned along the length of the elongate member.

Spacer portions 45 are located between adjacent pairs of base flanges 46 and between adjacent pairs of upper portion members 44. In the illustrated embodiment, the spacer portion 45 are pleated.

In use, the elongate member 31 is cut to a predetermined length by cutting along one of the spacer portions 45. The elongate member 31 is manipulated to the required shape and placed in the desired position, such that the outer abutment surface of the abutment member abuts the required surface, such as for example a wall or fence.

The first contact surface 35 of the base portion 134 (and base flanges 46) is placed adjacent a support surface. Attachment means are inserted through corresponding apertures 43 to secure the elongate member 31 in position. An adhesive layer is applied to the second contact surface 37 of the upper portion 36 of the elongate member 31. Ground material is then inserted within the channel 41 of the elongate member 31. A lawn covering, such as for example artificial lawn, in then secured to the second contact surface 37 of the upper portion 36.

It will be appreciated by persons skilled in the art that, in constructing an artificial lawn installation in which the edging used is that shown in FIGS. 11 and 12, the process to be followed is a minor modification of the process described above with reference to FIG. 10, one significant difference being that that embodiment shown in FIGS. 11 and 12, of course, lacks cut-outs with the result that the step illustrated in the first of the depictions in FIG. 10 would be omitted as unnecessary.

Further Description

The invention includes within its scope an artificial lawn edging for use in an artificial lawn installation comprising an artificial grass layer layered upon a support surface of a lawn base layer and extending to form an artificial lawn between perimeter edges which terminate the artificial grass layer and underlying lawn base support surface at a boundary thereof with another landscape surface, at least part of said boundary being non-linear and defined by said edging, the edging comprising an elongate member comprising a plurality of segments connected, each with a next adjacent one of said segments, at segment connections along the length of the elongate member, each segment having a segment base plate and an opposed wall member which respectively provide a base plate surface for seating upon and fixture to a support surface of a sub-base layer underlying, in the lawn installation, the lawn base layer and an upwardly-facing wall member surface which forms in aggregate with the upwardly-facing wall member surface(s) of the other segment(s), in the lawn installation, a continuity of said lawn base layer support surface upon which said artificial grass layer can be laid for fixture at a said perimeter edge thereof so that it is both retained and supported by the upwardly-facing wall member surfaces of the elongate member in aggregate, in each segment the wall member and segment base plate being connected to form an open cavity therebetween for receiving therein, in the lawn installation, a said perimeter portion of the lawn base layer in an overlying relationship thereof with said a segment base plate of the segment and in an underlying supporting relationship with said wall member, each of one or more segment-to-segment connections effecting connection by:—

(a) joining means comprising segment articulation first connection means which enables relative displacement in the plane of said sub-base layer surface, when the elongate member is disposed with the base plates seated thereon, between segments connected by said segment articulation first connection means to change the orientation of those segments relative to one another so that the length of the elongate member constituted by those segments can be deformed to follow the non-linear part of the boundary or (b) joining means comprising:
  (i) segment articulation first connection means which enables, subject to (b)(ii) below, relative displacement in the plane of said sub-base layer surface, when the elongate member is disposed with the segment base plates seated thereon, between segments connected by said segment articulation first connection means to change the orientation of those segments relative to one another so that the length of the elongate member constituted by those segments can be deformed to follow the non-linear part of the boundary and
  (ii) supplementary second connection means supplementing each of one or more of said so-articulated segment-to-segment connections and comprising in each case one or more severable connectors which substantially disable said relative displacement between segments connected by the articulation first connection means but permit it upon and following severance so that the length of the elongate member constituted by those displaceable segments can be deformed to follow the non-linear part of the boundary.

The invention claimed is:

1. An artificial grass edging for use with an artificial lawn having an artificial grass layer, the edging comprising a segmented elongate member in which a given segment of a plurality of segments is connected to one or more adjacent segments of the plurality of segments, wherein each segment has a first face and a second face, the first face for receiving a perimeter edge portion of the artificial grass layer for fixture thereto and the second face for positioning on a ground-support surface, the segments being connected together by connection means provided at a connection region of said elongate member, the connection means comprising:

first connection means comprising a sprung member including a resilient member having a pair of arms configured to a V-shape that is fixed to a pair of next adjacent segments of the plurality of segments, the resilient member being resiliently hinged to provide an articulation for enabling relative displacement between the pair of next adjacent segments to thereby deform the elongate member at the connection region such that said elongate member can follow a non-linearity in a boundary local to said connection region.

2. The edging of claim 1 wherein said pair of next adjacent segments comprises one or more successions of three or more said segments each of which segments is connected by said connection means to its next adjacent segment and which collectively make up one length of said elongate member and one or more further said segments which make up a balance of that length and form part of said plurality of segments, wherein at least one of said one or more successions of three or more said segments comprises at least eight said segments.

3. The edging of claim 1, wherein the connection means further comprises a second connection means comprising one or more severable stiffening members further connection for flexibility restraint across the connection region to thereby restrain or prevent deformation of the elongate member at the connection region.

4. The edging of claim 3 wherein a window is defined in the elongate member at said connection region between the first connection means, the second connection means and opposed edges of the first faces or opposed edges of the second faces of each corresponding adjacent segment making up a segment pair, whereby the first connection means is separated from the second connection means across said window.

5. The edging of claim 3 wherein said second connection means comprises a plurality of severable stiffening members which are removable or otherwise disconnectable from the elongate member to disapply said flexibility restraint, wherein said plurality of severable stiffening members are severable from the elongate member using a hand-held snipping tool, wherein a first stiffening member of the plurality of stiffening members extends between first elongate member elements of the pair of next adjacent segments, each of the first elongate member elements providing at least part of said first face and/or a second stiffening member of the plurality of stiffening members extends between second elongate member elements of the pair of next adjacent segments, each of the second elongate member elements providing at least part of said second face.

6. The edging of claim 3 wherein said second connection means comprises one or more separable regions of elongate member material, each of which confers or is responsible for applying said flexibility restraint, wherein said one or more separable regions are visibly designated to enable identification, wherein said one or more separable regions comprise regions of designated removable elongate member material, each region of designated removable elongate member material having lesser thickness than surrounding regions of the elongate member having uniform thickness, wherein a window is defined in the elongate member at said connection region between the first connection means, a separable region of elongate member material and opposed edges of the first faces or opposed edges of the second faces of each segment making up the pair of next adjacent segments, whereby the first connection means is separated from the separable region of elongate member material across said window and said separable region is identified by its relationship in juxtaposition with said window.

7. The edging of claim 3 wherein the connection region at which said segments of said pair of next adjacent segments are connected comprises a. a window between the segments connected at said connection region, said window having a first portion provided between the first faces of the pair of next adjacent segments and, in continuity of the first portion, a second portion provided between the second faces of the pair of next adjacent segments, said articulation interrupting said window at a junction between said faces to thereby form an interruption and extending either side of said interruption between an extremity defined by a first component of said second connection means and an extremity defined by a second component of said second connection means and the first and second connection means components respectively connecting the first faces of the pair of next adjacent segments together and connecting the second faces of the connected segments together, whereby the elongate member is rigid across said connection region or b. a structure as defined in (a) above in which one or both of the second connection means components are absent whereby the connection region is a void between the segments bridged by said articulation whereby the elongate member is flexible across said connection region and capable of conforming to a non-linearity in a boundary which the edging defines, in use, between a lawn area and another landscape surface.

8. The edging of claim 3 wherein said elongate member comprises plural segment connections where the pair of next adjacent segments are articulated together with said articulation and wherein one or more of said plural segment connections is further provided with said second connection means.

9. The edging of claim 3 wherein the flexibility restraint applied to the elongate member by the second connection means is configured to be disapplied by removal of the second connection means.

10. The edging of claim 3 wherein said elongate member is made of injection-moulded plastics material and comprises a succession of at least eight segments of the plurality of segments, each of which segments is connected by said connection means to a next adjacent segment in the succession by said connection means, each segment of the plurality of segments being connected to a corresponding next adjacent segment of the plurality of segments, each segment having a first face for receiving a perimeter edge portion of said artificial grass layer for fixture thereto, when the edging is in a boundary-located state, said faces each being provided, respectively, by a segment wall member and a segment base which are connected to form a cavity therebetween and to define an opening for admission to the cavity, in a lawn installation, of a perimeter portion of a lawn base layer in an overlying relationship thereof with said segment base and in an underlying supporting relationship with said wall member, each said cavity being open to a respective cavity of each of the pair of next adjacent segments across an inter-segmental region of the elongate member, each of said second connection means comprising one or more separable regions of elongate member material which confers or is responsible for applying said flexibility restraint, and said separable regions comprising regions of designated removable elongate member material, each region of designated removable elongate member material having lesser thickness than surrounding regions of the elongate member having uniform thickness.

11. The edging of claim 1, wherein said the resilient member comprises a plastics hinge.

12. The edging of claim 1 wherein the elongate member is configured for inclusion in a lawn installation in which the artificial grass layer is supported upon a surface of a lawn base layer disposed over a lawn sub-base, said first faces of said segments in aggregate forming a platform of said elongate member for receiving thereupon a perimeter edge portion of said artificial grass layer for fixture to said platform in termination of said artificial grass layer, said elongate member terminating said lawn base layer at a perimeter edge portion thereof which underlies said artificial grass layer perimeter edge portion and said second faces of said segments in aggregate forming a further platform which in use of the edging is disposed upon and engaged with said lawn sub-base.

13. The edging of claim 1 wherein said connection means connects the pair of next adjacent segments which each comprise a segment base and an opposed wall member, wherein the wall member provides said first face and said segment base provides said second face, wherein the segment base and opposed wall member are connected to form a cavity therebetween and to define an opening for admission to the cavity, in a lawn installation, of a perimeter portion of a lawn base layer in an overlying relationship thereof with said segment base and in an underlying supporting relationship with said wall member, wherein each cavity is open to a respective cavity of each of the pair of next adjacent segments across an inter-segmental region of the elongate member at which each segment in said pair of next adjacent segments are juxtaposed across the width of the elongate member.

14. The edging of claim 1 wherein the elongate member is configured for inclusion in a lawn installation (a) in which an artificial grass layer is fixed to said first face of each segment and terminates at a junction at which said first and second faces meet and (b) in which said junction abuts another landscape surface, wherein a flexibility restraint is not applied at the connection region to thereby enable a sweep of one of the pair of next adjacent segments across said ground-support surface, in which sweep that segment is rotationally displaced through an angle of at least 45 degrees at a fulcrum located on the elongate member at either the first side or the second side of the elongate member, wherein the elongate member is made of a plastics material, wherein the plastics material is a polyamide, wherein the elongate member is made of an injection moulded plastics material.

15. The edging of claim 1 wherein the segments of said elongate member comprises a succession of from six to twelve segments some or each of which is connected to its next adjacent segment in the succession by said connection means.

16. The edging of claim 1 wherein the pair of next adjacent segments connected by said first connection means are spaced apart such that, and said articulation has capacity to accommodate such a degree of displacement between the pair of next adjacent segments that, the pair of next adjacent segments can be re-oriented through a right angle or more.

17. The edging of claim 1 wherein a first segment connection is provided with the first connection means but with no second connection means, said first segment connection dividing the elongate member into two arms each comprising multiple segments of the plurality of segments arranged in respective successions with at least some second segment connections being provided with said first connection means, some or all of said second segment connections being provided with said second connection means.

18. A method of installing said artificial lawn, the method comprising providing an artificial lawn layer, a lawn base, a sub-base underlying the lawn base and an edging as claimed in claim 1, disposing the artificial lawn layer upon a support surface of the lawn base to form an artificial lawn between perimeter edges which terminate the artificial grass layer and lawn base support surface at a boundary thereof with another landscape feature, the edging being fixed to the sub-base at said boundary and, for any non-linearities in the boundary, having been previously made ready for deployment by segment re-orientation necessary for the elongate member deformation needed for said elongate member to follow said boundary, said segment re-orientation following action to disapply any flexibility restraint applied to the elongate member up until that time, and fixing the artificial lawn layer to said fixed edging.

19. A method of edging an artificial lawn area at the boundary thereof with another landscape feature which method comprises
  a. installing an artificial lawn in accordance with claim 18, wherein fixing the edging to the sub-base comprises disposing the second face of the elongate member of said edging on the sub-base so that the edging is in a position and orientation to receive an artificial grass layer edge portion on the first face of the elongate member of the edging, taking into account any non-linearities in the boundary, and
  b. fixing the artificial grass layer edge portion upon the first face of the elongate member.

20. The method of claim 18 wherein the edging receives a perimeter edge portion of the lawn base such that the lawn base underlies and supports the first face of the elongate member.

* * * * *